(12) United States Patent
Wloczysiak

(10) Patent No.: US 9,838,056 B2
(45) Date of Patent: Dec. 5, 2017

(54) INTEGROUS SIGNAL COMBINER

(71) Applicant: SKYWORKS SOLUTIONS, INC., Woburn, MA (US)

(72) Inventor: Stephane Richard Marie Wloczysiak, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/166,930

(22) Filed: May 27, 2016

(65) Prior Publication Data

US 2016/0352373 A1 Dec. 1, 2016

Related U.S. Application Data

(60) Provisional application No. 62/167,516, filed on May 28, 2015.

(51) Int. Cl.
| | | |
|---|---|---|
| *H04B 1/26* | (2006.01) | |
| *H04B 1/16* | (2006.01) | |
| *H04B 1/10* | (2006.01) | |

(52) U.S. Cl.
CPC .......... *H04B 1/163* (2013.01); *H04B 1/10* (2013.01)

(58) Field of Classification Search
CPC ...... H03D 7/1441; H03D 7/00; H03D 7/1433; H04B 1/30; H04B 1/28; H04B 1/18
USPC .............. 455/131, 313, 323, 334, 338–341
See application file for complete search history.

(56) References Cited

U.S. PATENT DOCUMENTS

| | | | | |
|---|---|---|---|---|
| 4,023,104 A | * | 5/1977 | Rheinfelder | .......... H04N 7/102 348/180 |
| 4,177,427 A | | 12/1979 | Shores | |
| 5,644,272 A | | 7/1997 | Dabrowski | |
| 6,298,224 B1 | | 10/2001 | Peckham | |

(Continued)

FOREIGN PATENT DOCUMENTS

| | | |
|---|---|---|
| CN | 102664687 A | 9/2012 |
| CN | 104101867 | 10/2014 |

(Continued)

OTHER PUBLICATIONS

Search Report for GB Appl. No. 1519072.1 dated Jul. 1, 2016, in 4 pages.

(Continued)

*Primary Examiner* — Nhan Le
(74) *Attorney, Agent, or Firm* — Oblon, McClelland, Maier & Neustadt, L.L.P.

(57) ABSTRACT

A front-end module (FEM) is disclosed that includes an integrous signal combiner. The integrous signal combiner can process received signals and use a set of resonant circuits to filter signal noise prior to recombination of a plurality of signal bands that form an aggregate carrier signal. These resonant circuits may be placed after a set of low noise amplifiers and can be used to more efficiently reduce noise and parasitic loading within each of a set of signal paths. Each resonant circuit may be configured to filter noise relating to a bandwidth for a signal that is to be combined with the signal of the signal path that includes the resonant circuit. In some implementations, the integrous signal combiner can be a tunable integrous signal combiner with resonant circuits that may be reconfigurable or dynamically configurable.

17 Claims, 13 Drawing Sheets

(56) References Cited

U.S. PATENT DOCUMENTS

| | | |
|---|---|---|
| 6,917,815 B2 | 7/2005 | Hajimiri et al. |
| 6,950,077 B1 | 9/2005 | Bae |
| 6,970,681 B2 | 11/2005 | Darabi et al. |
| 6,973,183 B1 | 12/2005 | Garcia |
| 7,116,952 B2 | 10/2006 | Arafa |
| 7,250,830 B2 | 7/2007 | Layne et al. |
| 7,369,827 B1 | 5/2008 | Koch et al. |
| 7,689,187 B2 | 3/2010 | Galan |
| 8,036,315 B2 | 10/2011 | Rabbath et al. |
| 8,081,047 B2 | 12/2011 | Royak et al. |
| 8,200,181 B1 | 6/2012 | Khlat et al. |
| 8,314,653 B1 | 11/2012 | Granger-Jones et al. |
| 8,699,977 B2 | 4/2014 | Babitch et al. |
| 8,824,361 B2 | 9/2014 | Rugamer et al. |
| 9,002,309 B2 | 4/2015 | Sahota et al. |
| 9,190,699 B2 | 11/2015 | Granger-Jones et al. |
| 9,485,001 B2 | 11/2016 | Wloczysiak |
| 9,571,037 B2 | 2/2017 | Wloczysiak et al. |
| 2003/0186660 A1 | 10/2003 | Lee |
| 2004/0087294 A1 | 5/2004 | Wang |
| 2004/0125902 A1 | 7/2004 | Nishimura et al. |
| 2004/0147230 A1 | 7/2004 | Nast et al. |
| 2005/0197095 A1 | 9/2005 | Nakamata |
| 2005/0242990 A1 | 11/2005 | Lawrence et al. |
| 2006/0135097 A1 | 6/2006 | Wang et al. |
| 2006/0256754 A1 | 11/2006 | Liu et al. |
| 2008/0055016 A1 | 3/2008 | Morris |
| 2008/0102760 A1 | 5/2008 | McConnell et al. |
| 2008/0129410 A1 | 6/2008 | Fukuda |
| 2008/0144544 A1 | 6/2008 | Shi et al. |
| 2008/0211586 A1 | 9/2008 | Galan |
| 2008/0212552 A1 | 9/2008 | Fukamachi et al. |
| 2008/0238569 A1 | 10/2008 | Matsuo |
| 2008/0240000 A1 | 10/2008 | Kidd |
| 2009/0015508 A1 | 1/2009 | Prikhodko et al. |
| 2009/0093270 A1 | 4/2009 | Block |
| 2009/0322632 A1 | 12/2009 | Milosevic |
| 2010/0090777 A1 | 4/2010 | Song et al. |
| 2010/0157858 A1 | 6/2010 | Lee |
| 2010/0178879 A1 | 7/2010 | Sato et al. |
| 2010/0291915 A1 | 11/2010 | Nast et al. |
| 2011/0095943 A1 | 4/2011 | Letestu |
| 2011/0116422 A1 | 5/2011 | Nast |
| 2011/0143685 A1 | 6/2011 | Cebi |
| 2011/0210805 A1 | 9/2011 | Link |
| 2012/0091799 A1 | 4/2012 | Rofougaran et al. |
| 2012/0120313 A1 | 5/2012 | Green et al. |
| 2012/0128034 A1 | 5/2012 | Feher |
| 2012/0202445 A1* | 8/2012 | Manetakis ............... H04B 1/18 455/341 |
| 2012/0302188 A1 | 11/2012 | Sahota et al. |
| 2013/0003783 A1 | 1/2013 | Gudem |
| 2013/0016633 A1 | 1/2013 | Lum |
| 2013/0029624 A1 | 1/2013 | Bendsen |
| 2013/0043946 A1 | 2/2013 | Hadjichristos et al. |
| 2013/0051284 A1 | 2/2013 | Khlat |
| 2013/0063223 A1 | 3/2013 | See |
| 2013/0122831 A1 | 5/2013 | Desclos et al. |
| 2013/0165059 A1 | 6/2013 | Son et al. |
| 2013/0222056 A1 | 8/2013 | Lin |
| 2013/0244722 A1 | 9/2013 | Rousu |
| 2013/0273861 A1 | 10/2013 | See |
| 2013/0281039 A1 | 10/2013 | Cathelin et al. |
| 2013/0343237 A1 | 12/2013 | Mikhemar et al. |
| 2014/0003300 A1 | 1/2014 | Weissman |
| 2014/0015607 A1 | 1/2014 | Li |
| 2014/0024322 A1 | 1/2014 | Khlat |
| 2014/0065985 A1 | 3/2014 | Weissman et al. |
| 2014/0079167 A1 | 3/2014 | Adam et al. |
| 2014/0087673 A1 | 3/2014 | Mostov et al. |
| 2014/0092795 A1 | 4/2014 | Granger-Jones |
| 2014/0112213 A1 | 4/2014 | Norholm et al. |
| 2014/0227982 A1 | 8/2014 | Granger-Jones et al. |
| 2015/0024947 A1 | 1/2015 | Letovksy et al. |
| 2015/0180439 A1 | 6/2015 | Reiha |
| 2015/0200702 A1 | 7/2015 | Weichert et al. |
| 2015/0207536 A1 | 7/2015 | Yehezkely et al. |
| 2015/0249479 A1 | 9/2015 | Nobbe |
| 2015/0256207 A1 | 9/2015 | Liao et al. |
| 2015/0295596 A1 | 10/2015 | Wloczysiak |
| 2015/0295597 A1 | 10/2015 | Wloczysiak |
| 2015/0326206 A1 | 11/2015 | Nobbe |
| 2015/0362583 A1 | 12/2015 | Ainspan et al. |
| 2016/0020737 A1* | 1/2016 | Kong .................. H03F 3/19 455/73 |
| 2016/0126987 A1 | 5/2016 | Wloczysiak |
| 2016/0126993 A1 | 5/2016 | Wloczysiak |
| 2016/0126994 A1 | 5/2016 | Domino et al. |
| 2016/0127014 A1 | 5/2016 | Wloczysiak |
| 2016/0127025 A1 | 5/2016 | Wloczysiak |
| 2016/0127029 A1 | 5/2016 | Wloczysiak |
| 2016/0352374 A1 | 12/2016 | Wloczysiak |
| 2017/0026090 A1 | 1/2017 | Wloczysiak |

FOREIGN PATENT DOCUMENTS

| | | |
|---|---|---|
| EP | 0744831 A2 | 11/1996 |
| EP | 0959567 A1 | 11/1999 |
| EP | 2453588 A1 | 5/2012 |
| EP | 2736175 A1 | 5/2014 |
| GB | 2512586 A | 10/2014 |
| GB | 2512669 A2 | 10/2014 |
| JP | H06-030347 A1 | 2/1994 |
| JP | H07-095100 | 7/1995 |
| JP | H09-153826 | 6/1997 |
| JP | 2001-189670 | 7/2001 |
| JP | 2003-133982 A1 | 5/2003 |
| JP | 2004-208221 | 7/2004 |
| JP | 2008-271551 A1 | 11/2008 |
| JP | 2009-077331 A1 | 4/2009 |
| JP | 2009-302987 | 12/2009 |
| JP | 2010-206330 | 9/2010 |
| JP | 2011-155512 | 8/2011 |
| JP | 2012-205207 | 10/2012 |
| KR | 1020040070618 | 8/2004 |
| KR | 1020040100056 A1 | 12/2004 |
| KR | 202009005039 A1 | 5/2009 |
| KR | 1020050023641 A1 | 7/2010 |
| KR | 1020100071152 A1 | 11/2010 |
| KR | 1020120077695 A1 | 7/2012 |
| KR | 101235048 B1 | 2/2013 |
| KR | 1020130065485 | 6/2013 |
| KR | 1020140099890 | 8/2014 |
| WO | WO 97-41643 A1 | 11/1997 |
| WO | WO 03-090370 A1 | 10/2003 |
| WO | WO 2005-107064 A1 | 11/2005 |
| WO | WO 2005-125031 A1 | 12/2005 |
| WO | WO 2008-133854 A1 | 11/2008 |
| WO | WO 2013-025953 A1 | 2/2013 |
| WO | WO 2013-085721 A1 | 6/2013 |
| WO | WO 2014-120246 | 8/2014 |

OTHER PUBLICATIONS

International Search Report and Written Opinion dated Feb. 16, 2017 in corresponding PCT Application No. PCT/US2016/036253, 7 pgs.

* cited by examiner

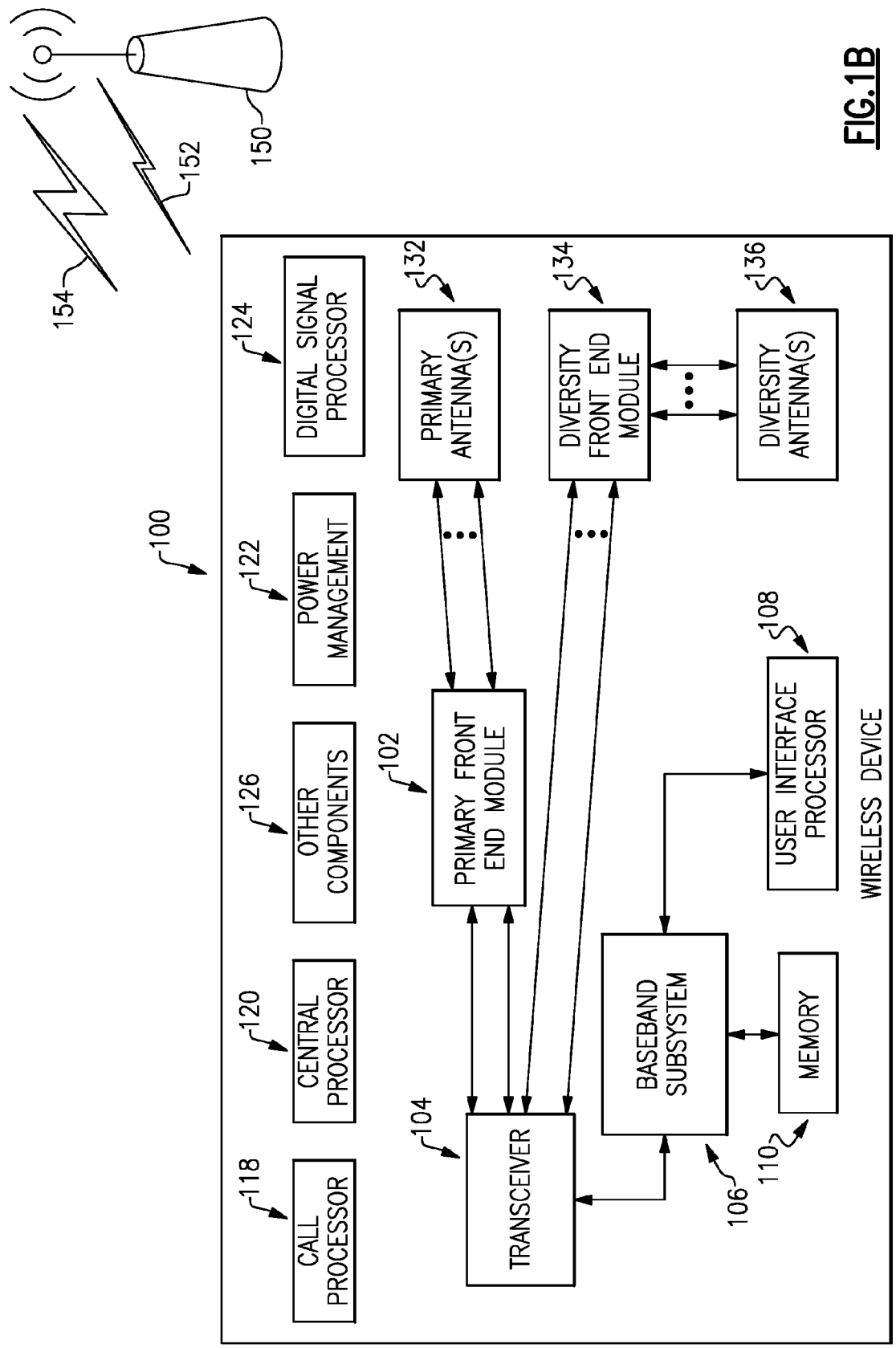

B30 TANK ON B4 SHARED LNA OUTPUT
Q=25
L=0.6nH
C=7.55pF

B2 TANK ON B1 SHARED LNA OUTPUT
Q=25
L=0.6nH
C=11pF

INTEGROUS SIGNAL COMBINER

RELATED APPLICATIONS

This disclosure claims priority to U.S. Provisional Application No. 62/167,516, which was filed on May 28, 2015 and is titled "MULTIBAND SIGNAL AGGREGATION," the disclosure of which is expressly incorporated by reference herein in its entirety for all purposes. Further, this application is related to U.S. patent application Ser. No. 15,167,130, which was filed on May 27, 2016 and is titled "IMPEDANCE MATCHING INTEGROUS SIGNAL COMBINER," the disclosure of which is expressly incorporated by reference herein in its entirety for all purposes.

BACKGROUND

Technical Field

This disclosure relates to carrier aggregation and, in particular, to processing received multiband signals.

Description of Related Technology

Often, wireless communication involves sending and receiving signals along a particular communication band. However, in some cases, wireless communication may involve the use of multiple communication bands, which is sometimes referred to as multiband communication and may involve multiband signal processing. Usually, when a wireless device receives a multiband signal, the wireless device will perform carrier aggregation to aggregate the constituent signals. This can result in a wider bandwidth and it can be possible to receive data or communication signals at a higher data rate.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 1B is a block diagram of one example of the wireless device of FIG. 1A in communication with a base station.

SUMMARY

Figure 1A:
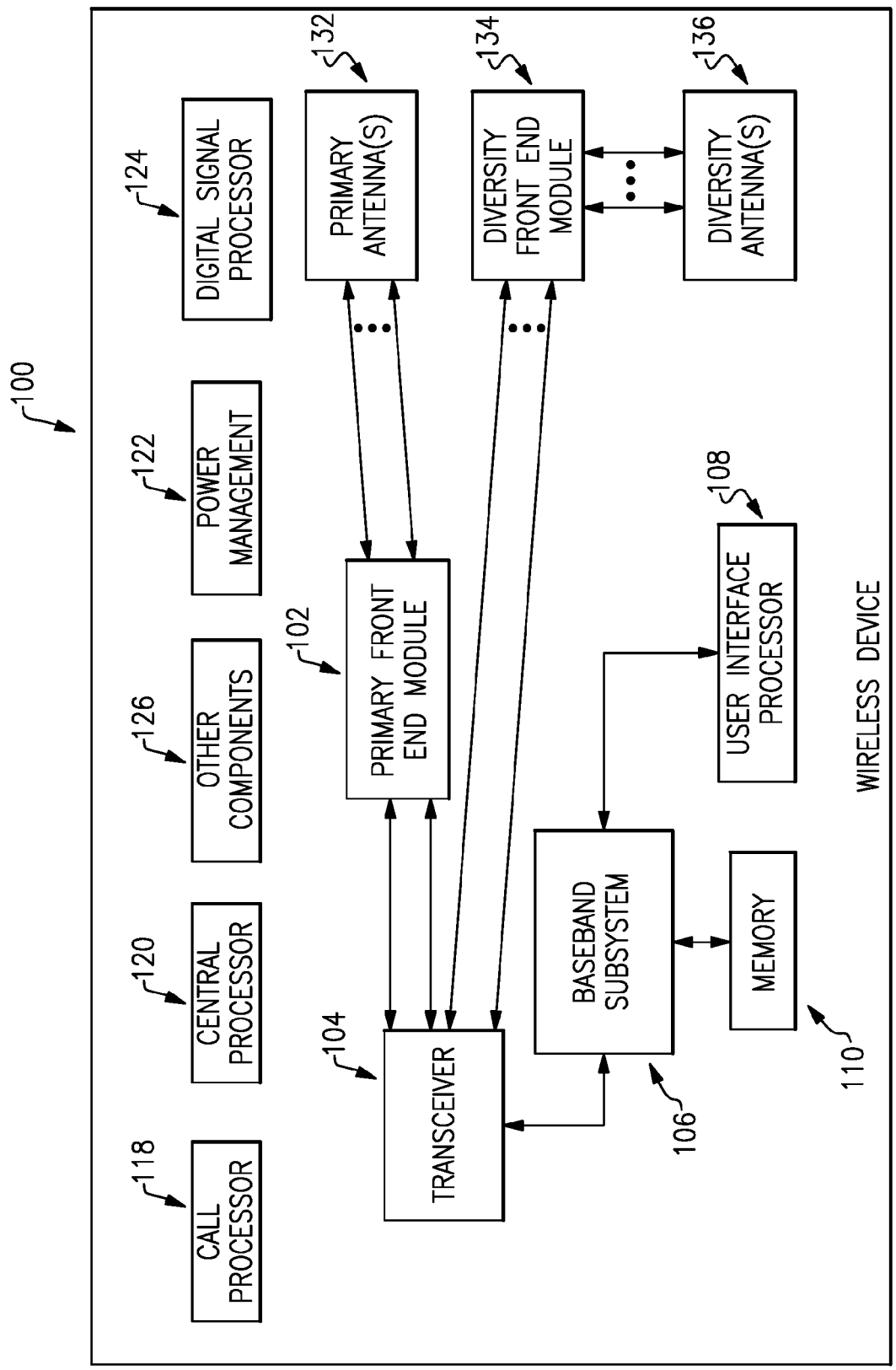
FIG. 1A is a block diagram of one example of a wireless device that includes a front end module.

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to an integrous signal combiner. The integrous signal combiner may include a plurality of inputs with each input configured to receive a signal of a different frequency than the other inputs of the plurality of inputs. Further, the integrous signal combiner may include an output configured to provide an integrous signal to a subsequent processing block. In addition, the integrous signal combiner may include a plurality of low noise amplifiers (LNAs) and a plurality of resonant circuits. In some implementations, each resonant circuit corresponds to a different LNA from the plurality of LNAs.

In some embodiments, the subsequent processing block is a transceiver. Further, in certain designs, the integrous signal combiner includes a combiner configured to combine a plurality of integrous signals. Each, or at least some, of the integrous signals from the plurality of integrous signals may be output by a different resonant circuit from the plurality of resonant circuits. In some cases, the integrous signal is a combined signal created from a plurality of communication bands. In other cases, the integrous signal is formed from a single communication band.

With some embodiments, at least one resonant circuit from the plurality of resonant circuits includes a switch that when closed causes the at least one resonant circuit to be bypassed. Moreover, in certain implementations, the integrous signal combiner includes a switch between an LNA from the plurality of LNAs and a corresponding resonant circuit from the plurality of resonant circuits. This switch may be configured to switch between the corresponding resonant circuit and a bypass path that bypasses the corresponding resonant circuit. Furthermore, at least one resonant circuit from the plurality of resonant circuits may include a switched capacitor enabling the at least one resonant circuit to be dynamically adjusted.

Other aspects of the present disclosure relate to a front-end module (FEM). The FEM may include a multiplexer network configured to receive a signal from a diversity antenna and to split the signal into a plurality of signal portions corresponding to a plurality of communication bands. In addition, the FEM may include an integrous signal combiner configured to receive the plurality of communication bands at a plurality of inputs. Each, or at least some, of the inputs may receive a signal portion associated with a different communication band from the plurality of communication bands. Further, the integrous signal combiner can include the plurality of inputs and an output configured to provide an integrous signal to a subsequent processing block. In addition, the integrous signal combiner may include a plurality of low noise amplifiers (LNAs) and a plurality of resonant circuits. Each, or at least some, of the resonant circuits may correspond to a different LNA from the plurality of LNAs.

In certain embodiments, the FEM may further include a plurality of filters positioned between the multiplexer network and the integrous signal combiner. Each, or at least some, of the filters from the plurality of filters may receive a different signal portion from the plurality of signal portions and may be configured to remove out-of-band signals from the received signal portion. Moreover, the integrous signal combiner, in some implementations, further includes a combiner configured to combine a plurality of integrous signals. Each, or at least some, of the integrous signals from the plurality of integrous signals may be output by a different resonant circuit from the plurality of resonant circuits. In some cases, the integrous signal is a multiband signal created from a plurality of communication bands.

In some implementations, at least one resonant circuit from the plurality of resonant circuits includes a bypass switch that when closed causes a filter circuit of the at least one resonant circuit to be bypassed. Moreover, the integrous signal combiner may further include a switch between an LNA from the plurality of LNAs and a corresponding resonant circuit from the plurality of resonant circuits. The switch may be configured to switch between a signal path that includes the corresponding resonant circuit and a bypass path that does not include the corresponding resonant circuit. In some cases, at least one resonant circuit from the plurality of resonant circuits may include an adjustable capacitor enabling the at least one resonant circuit to be dynamically adjusted.

Some aspects of the present disclosure relate to a wireless device. The wireless device may include an antenna configured to receive a carrier aggregated (CA) signal from a base station and a front-end module (FEM) including a multiplexer network and an integrous signal combiner. The multiplexer network may be configured to split the CA signal received at the antenna into a plurality of signal portions corresponding to a plurality of communication bands. The integrous signal combiner may be configured to receive the plurality of communication bands at a plurality of inputs. Each, or at least some, of the inputs may receive a signal portion associated with a different communication band from the plurality of communication bands. The integrous signal combiner can include the plurality of inputs, an output configured to provide an integrous signal to a subsequent processing block, a plurality of low noise amplifiers (LNAs), and a plurality of resonant circuits. Each, or at least some, of the resonant circuits may correspond to a different LNA from the plurality of LNAs.

In some embodiments, the antenna is a diversity antenna and the FEM is a diversity FEM. Moreover, the FEM may further include a plurality of filters positioned between the multiplexer network and the integrous signal combiner. Each, or at least some, of the filters from the plurality of filters may receive a different signal portion from the plurality of signal portions and may be configured to remove noise components from the received signal portion. In some cases, each, or at least some, of the plurality of resonant circuits may be deactivated when the FEM receives a single band signal from the antenna. At least one resonant circuit from the plurality of resonant circuits may include an adjustable circuit element enabling the at least one resonant circuit to be dynamically tuned.

Certain aspects of the present disclosure relate to an integrous signal combiner. The integrous signal combiner may include a first low noise amplifier (LNA) configured to process a first receive signal of a first bandwidth to obtain a first amplified receive signal. Further, the integrous signal combiner may include a second LNA configured to process a second receive signal of a second bandwidth to obtain a second amplified receive signal. In addition, the integrous signal combiner may include a first resonant circuit in electrical communication with the first LNA. The first resonant circuit may be configurable to filter noise within the first amplified receive signal corresponding to at least the second bandwidth. Moreover, the integrous signal combiner may include a second resonant circuit in electrical communication with the second LNA. The second resonant circuit may be configurable to filter noise within the second amplified receive signal corresponding to at least the first bandwidth.

With some implementations, the first resonant circuit is further configurable to operate in a bypass mode. Moreover, the integrous signal combiner may further include a combiner configured to combine at least the first amplified receive signal and the second amplified receive signal. In addition, the integrous signal combiner may include an impedance matching network configured to match the impedance of at least the first resonant circuit and the second resonant circuit. Furthermore, the impedance matching network may combine at least the first amplified receive signal and the second amplified receive signal.

In some embodiments, the integrous signal combiner may include a third LNA configured to process a third receive signal of a third bandwidth to obtain a third amplified receive signal. Furthermore, the integrous signal combiner may include a third resonant circuit in electrical communication with the third LNA. The third resonant circuit may be configurable to filter noise within the third amplified receive signal corresponding to at least one of the first bandwidth or the second bandwidth. In some cases, the third LNA is not in electrical communication with a resonant circuit. Moreover, in some cases, the third LNA is further configured to provide the third amplified receive signal to a transceiver without filtering noise within the third amplified receive signal corresponding to at least one of the first bandwidth or the second bandwidth. In some cases, at least one of the first LNA, the second LNA, or the third LNA is configured to be inactive while at least one other LNA of the first LNA, the second LNA, or the third LNA is configured to be active.

In certain implementations, the first resonant circuit includes a first filter and the second resonant circuit includes a second filter. Further, the first resonant circuit may include a first set of switched capacitors and the second resonant circuit may include a second set of switched capacitors.

Some other aspects of the present disclosure relate to a front-end module (FEM). The FEM may include an integrous signal combiner and an impedance matching network. The integrous signal combiner may include a first low noise amplifier (LNA) configured to process a first receive signal of a first bandwidth to obtain a first amplified receive signal and a second LNA configured to process a second receive signal of a second bandwidth to obtain a second amplified receive signal. Further, the integrous signal combiner may include a first resonant circuit in electrical communication with the first LNA. The first resonant circuit may be configurable to filter noise within the first amplified receive signal corresponding to at least the second bandwidth. In addition, the integrous signal combiner may include a second resonant circuit in electrical communication with the second LNA. The second resonant circuit may be configurable to filter noise within the second amplified receive signal corresponding to at least the first bandwidth. Moreover, the impedance matching network may be in communication with the integrous signal combiner and may be configured to match the impedance of at least the first resonant circuit and the second resonant circuit.

In certain embodiments, the impedance matching network is further configured to combine at least the first amplified signal and the second amplified signal. Further, the first resonant circuit may be further configurable to operate in a bypass mode. In addition, the first resonant circuit may include at least one configurable element enabling the integrous signal combiner to be dynamically tuned.

Additional aspects of the present disclosure relate to a wireless device that includes an antenna and a front-end module. The antenna may be configured to receive a multiband signal including at least a first signal of a first bandwidth and a second signal of a second bandwidth. Further, the FEM may be in electrical communication with the antenna and may include an integrous signal combiner. The integrous signal combiner may include a first low noise amplifier (LNA), a second LNA, a first resonant circuit in electrical communication with the first LNA, and a second resonant circuit in electrical communication with the second LNA. The first LNA may be configured to process the first signal to obtain a first amplified signal. In addition, the second LNA may be configured to process the second signal to obtain a second amplified signal. The first resonant circuit may be configurable to filter noise within the first amplified signal corresponding to at least the second bandwidth and the second resonant circuit may be configurable to filter noise within the second amplified signal corresponding to at least the first bandwidth.

In certain implementations, the first resonant circuit is further configurable to operate in a bypass mode. Moreover, the integrous signal combiner may further include a combiner configured to combine at least the first amplified signal and the second amplified signal. In addition, in certain embodiments, the integrous signal combiner may include a matching impedance network configured to match the impedance of at least the first resonant circuit and the second resonant circuit. Further, the impedance matching circuit may combine at least the first amplified signal and the second amplified signal.

In some embodiments, the multiband signal further includes a third signal of a third bandwidth and the integrous signal combiner further includes a third LNA configured to process the third signal to obtain a third amplified signal. The integrous signal combiner may further include a third resonant circuit in electrical communication with the third LNA. The third resonant circuit may be configurable to filter noise within the third amplified signal corresponding to at least one of the first bandwidth or the second bandwidth. Moreover, the wireless device may further include a transceiver in electrical communication with the FEM. In some such embodiments, the third LNA is further configured to provide the third amplified signal to the transceiver without noise within the third amplified signal corresponding to at least one of the first bandwidth or the second bandwidth being filtered. In certain embodiments, at least one of the first LNA, the second LNA, or the third LNA is configured to be inactive while at least one other LNA of the first LNA, the second LNA, or the third LNA is configured to be active. Moreover, the first resonant circuit may include a first set of switched capacitors and the second resonant circuit includes a second set of switched capacitors.

In certain additional aspects of the present disclosure, a method of processing a multiband signal is disclosed. The method may include receiving a multiband signal at an antenna of a wireless device. Further, the multiband signal may include at least a first signal of a first bandwidth and a second signal of a second bandwidth. In addition, the method may include amplifying the first signal to obtain a first amplified signal and filtering noise from the first amplified signal based on the second bandwidth to obtain a first filtered amplified signal. The method may further include amplifying the second signal to obtain a second amplified signal and filtering noise from the second amplified signal based on the first bandwidth to obtain a second filtered amplified signal. In addition, the method may include combining the first filtered amplified signal and the second filtered amplified signal.

In some embodiments, the method further includes configuring a first resonant circuit to filter the noise associated with the second bandwidth from the first amplified signal. Further, configuring the first resonant circuit may include configuring a set of switched capacitors based on the second bandwidth. In some cases, the method further includes configuring a second resonant circuit to filter the noise associated with the first bandwidth from the second amplified signal. In some cases, the first signal is amplified using a first low noise amplifier (LNA) and the second signal is amplified using a second LNA.

DETAILED DESCRIPTION

Introduction

One challenge with multiband carrier aggregation ("CA"), or signal processing, is the minimizing of noise from each signal path for each communication band or bandwidth during the aggregation process. Typically, the signal path will include a low noise amplifier (LNA) to amplify a received signal. The use of an LNA is often necessary because many times the received signal will be too weak for use by the wireless device when initially received by an antenna of the wireless device. However, in some cases, not only will the LNA amplify the desired receive signal, but it will also amplify some of the noise that is on the receive line. This problem may be exacerbated in systems that support carrier aggregation because such systems will include multiple lines configured to receive and process signals of different frequency bands. Thus, one CA signal comprising one set of frequency bands may cause and/or be affected by different noise frequency components on a receive line of the communication path of a wireless device compared to another CA signal comprising a different set of frequency bands.

Another challenge with multiband carrier aggregation is the occurrence of parasitic loading. With some implementations of multiband carrier aggregation, a separate communication path may exist for each processed communication band. Often, the multiple communication paths will be configured in parallel, which can result in a drop in impedance in each communication path. Consequently, the drop in impedance along each communication path can result in a drop in the gain and the power output by the LNA in the communication path. One method of addressing the challenge of minimizing noise and parasitic loading in the signal path is to insert a pre-processing network prior to the LNA. This pre-processing network may include phase shifters or switched combiners. However, the pre-processing of the signal can decrease signal integrity for the received signal.

Embodiments described herein relate to a front-end module (FEM) that can process receive signals and that can include resonant circuits to filter signal noise prior to recombination of a plurality of signal bands that form the aggregate carrier signal. The resonant circuit is sometimes referred to as a tuned circuit or a tank circuit. In some implementations, the resonant circuit includes an inductor and capacitor combination (e.g., an LC circuit). Alternatively, or in addition, the resonant circuit can include a crystal oscillator, a surface acoustic wave (SAW) resonator, a bulk acoustic wave (BAW) resonator, or any other type of resonance circuit that can be selectively configured based on a received signal bandwidth. These resonant circuits may be placed after the LNA and can be used to more efficiently reduce noise and parasitic loading within each of the signal paths. In some cases, the resonant circuits may reduce parasitic loading by maintaining the impedance of the signal path at a particular impedance (e.g., 50Ω). In some embodiments described herein, the FEM may also include an impedance matching circuit to facilitate maintaining the particular impedance and/or to match the impedance across each communication path and/or with an output path of the FEM, which may be to a transceiver or receiver. Each resonant circuit may be configured to filter noise relating to a bandwidth for a signal that is to be combined with the signal of the signal path that includes the resonant circuit. Thus, for example, a resonant circuit in a first signal path for processing a first signal of a first frequency band may be configured to filter or reduce noise that relates to a second frequency band corresponding to a second signal of the second frequency band that is to be combined with the first signal. In certain embodiments, the resonant circuits may be reconfigurable or dynamically configurable.

Advantageously, in certain embodiments, the ability to reconfigure the resonant circuit enables the wireless device to process different combinations of frequency bands while reducing the size and complexity of the resonant circuits compared to solutions that include a separate resonant circuit for each supported communication band. Further, in certain embodiments, placing the resonant circuit subsequent to the LNA reduces or eliminates the reduction of signal integrity that can occur with other carrier aggregation solutions and prevents additional signal loss.

Example Wireless Device

FIG. 1A is a block diagram of one example of a wireless device 100 that includes a primary front end module (FEM) 102 and a diversity FEM 134. The wireless device 100 may support multiple communications standards (such as 2G, 3G, 4G, and 4G LTE, and so forth). By way of example, the wireless device 100 can implement the Global System for Mobile (GSM) communication standard, which is a mode of digital cellular communication that is utilized in many parts of the world. GSM mode capable mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of 800 MHz, 900 MHz, 1800 MHz and 1900 MHz bands, while certain W-CDMA and Long Term Evolution (LTE) devices can operate over, for example, as many as twenty-two, or in some cases even more, radio frequency spectrum bands.

Further, the wireless device 100 can support multiband and/or multi-mode communication. Moreover, it should be understood that the wireless device 100 is but one non-limiting example of a wireless device and that other embodiments of the wireless device 100 are possible.

In certain embodiments, in addition to the primary FEM 102 and the diversity FEM 134, the wireless device 100 can include a transceiver 104, a baseband subsystem 106, a user interface processor 108, a memory 110, a call processor 118, a central processor 120, a power management component 122, a digital signal processor (DSP) 124, one or more primary antennas 132, one or more diversity antennas 136, and other components 126. Some or all of these components may be electrically connected with each other. Components that are electrically connected may be directly connected enabling a signal to be passed from one component to the next component. Alternatively, components that are electrically connected may be indirectly connected such that one or more intermediary components may exist between two components. A number of connections between the various components of the wireless device 100 are possible, and are omitted from FIG. 1A for clarity of illustration only and not to limit the disclosure. For example, the power management component 122 may be electrically connected to the baseband subsystem 106, the primary FEM 102, the diversity FEM 134, the DSP 124, or other components 126. As a second example, the baseband subsystem 106 may be connected to a user interface processor 108 that may facilitate input and output of voice and/or data provided to and/or received from the user.

Typically, the wireless device 100 can receive one or more communications signals via one or more primary antennas 132, one or more diversity antennas 136, or a combination of primary antennas 132 and diversity antennas 136. In some cases, at least some of the received communication signals can be multiband signals. These multiband signals may include signals of multiple frequencies or of multiple frequency bands. In some cases, the frequency bands may be associated with standardized communication frequencies. For example, band 1 of the long-term evolution (LTE) standard may be centered around 2.1 GHz. In some cases, a communication band may consist of a single frequency. However, in other cases, the communication band may have a larger bandwidth that includes a range of frequencies and is centered around a central frequency. Thus, continuing the example of band 1 within the LTE standard, the band for downlink may have a bandwidth of 60 MHz centered around 2140 MHz. In such a case, the band 1 may be between 2110 MHz and 2170 MHz.

The transceiver 104 can generate RF signals for transmission via the primary antenna(s) 132 and/or the diversity antenna(s) 134. Furthermore, the transceiver 104 can receive incoming RF signals from the primary antenna(s) 132 and/or the diversity antenna(s) 136. As stated above, the received signals may be of different bands that can be aggregated together by the diversity FEM 134, as will be described in more detail below. It will be understood that various functionalities associated with the transmitting and receiving of RF signals can be achieved by one or more components that are collectively represented in FIG. 1A as the transceiver 104. For example, a single component can be configured to provide both transmitting and receiving functionalities. In another example, transmitting and receiving functionalities can be provided by separate components. The transceiver 104 may include a separate receiver and transmitter. In some implementations, the transceiver 104 is replaced by a separate receiver component and a separate transmitter component. With wireless devices that are capable of processing multiband signals, the transceiver 104 may receive an aggregate signal from the diversity FEM 134.

In some cases, one or more of the antennas 132 and 136 of the wireless device 100 may be configured to transmit and/or receive at different frequencies or within different frequency ranges. Further, one or more of the antennas may be configured to work with different wireless networks. Thus, for example, one primary antenna 132 may be configured to transmit and receive signals over a 2G network, and another primary antenna 132 may be configured to transmit and receive signals over a 3G network. In some cases, multiple antennas 132 may be configured to transmit and receive signals over, for example, a 2.5G network, but at different frequencies. In some implementations, the diversity antennas 136 may communication over the same networks as the primary antennas 132 while in other implementations, the diversity antennas 136 may be configured to communication over different networks or different frequencies than the primary antennas 132.

In FIG. 1A, one or more communication signals may be communicated between the transceiver 104 and the primary antennas 132 and/or the diversity FEM 134 via one or more transmission paths. Different receiving transmission paths can represent paths associated with different bands. Moreover, although not illustrated, one or more transmission paths may also exist between the transceiver 104 and the diversity FEM 134.

The diversity FEM 134 can be used to process signals received and/or transmitted using the diversity antenna(s) 136. In certain configurations, the diversity FEM 134 can be used to provide filtering, amplification, switching, and/or other processing. Further, the diversity FEM 134 can be used to process a signal before providing the signal to an antenna switch module (not shown), which can provide the signal to the transceiver 104. In some cases, the diversity FEM 134 can include a number of switches for switching between high-band (HB), mid-band (MB), and/or low-band (LB) signals that may be received by and/or transmitted over one or more of the diversity antennas 136.

In some implementations, the wireless device 100 may further include an antenna switch module between the primary antennas 132 and the diversity antennas 136, and the primary FEM 102 and the diversity FEM 134. The antenna switch module can determined based on a received signal and/or a control signal from, for example, the call processor 118 whether to provide a received signal from a primary antenna 132 to a primary FEM 102 or to provide a received signal from the diversity antenna 136 to the diversity FEM 134. In certain embodiments, the wireless device 100 may include a single FEM, and the antenna switch module can determine whether to provide a received signal from the primary antenna 132 or from the diversity antenna 136 to the FEM.

The transceiver 104 may interact with a baseband sub-system 106 that is configured to provide a conversion between data and/or voice signals suitable for processing by one or more user interface elements and RF signals suitable for processing by the transceiver 104. The transceiver 104 may also be electrically connected to a power management component 122 that is configured to manage power for the operation of the wireless device 100. Such power management can also control operations of the baseband sub-system 106 and the FEMs 102 and 136, among other components. Further, the power management component 122 may provide a supply voltage to a switch mode boost converter (not shown), which may boost the voltage before providing the voltage to a power amplifier or an LNA. It should also be understood that the power management component 122 may include a power supply, such as a battery. Alternatively, or in addition, one or more batteries may be separate components within the wireless device 100.

The baseband sub-system 106 can also be connected to a memory 110 that may be configured to store data and/or instructions to facilitate the operation of the wireless device 100, and/or to provide storage of information for the user.

In some embodiments, the call processor 118 may be in communication with the base station. The call processor 118 may be configured to control one or more power amplifier modules (PAMs) or power amplifiers (PAs), which may be included as part of the FEM 102, the transceiver 104, or otherwise. Further, the call processor may configure the diversity FEM 134 based on control information received from the base station and/or information included in a receive signal. For example, the call processor may configure the diversity FEM 134 based on a frequency band of a receive signal. In some cases, multiple receive signals of different frequency bands may be received. In such cases, the call processor 118 may configure the diversity FEM 134 based on each of the different frequency bands. More details on controlling the diversity FEM 134 are disclosed below.

As previously mentioned, the wireless device 100 may include one or more central processors 120. Each central processor 120 may include one or more processor cores. The central processor 120 typically facilitates execution of processes on the wireless device, such as applications. The central processor 120 may interact with the user interface processor 108 to interact with a user. The user interface processor 108 may include any system for interacting with a user of the wireless device 100. The user interface processor may consist of multiple systems. For example, the user interface processor 108 may include a graphics processor, an I/O processor, an audio processor, and so forth. In some cases, the central processor 120 may facilitate wireless functionality of the wireless device 100. However, in other embodiments, wireless communication or cellular communication management is handled by the call processor 118 and the central processor 120 may or may not be involved in wireless communications.

A number of other wireless device configurations can utilize one or more features described herein. For example, a wireless device can include additional antennas and additional connectivity features such as Wi-Fi, Bluetooth, and GPS. Further, the wireless device 100 may include any number of additional components 126, such as analog to digital converters, digital to analog converters, graphics processing units, solid state drives, etc. Moreover, the wireless device 100 can include any type of device that may communicate over one or more wireless networks and that may include a diversity FEM 134. For example, the wireless device 100 may be a cellular phone, including a smartphone or a dumbphone, a tablet, a laptop, a video game device, a smart appliance, etc.

FIG. 1B is a block diagram of one example of the wireless device 100 of FIG. 1A in communication with a base station 150. Although the element 150 is described as a base station, the present disclosure is not limited as such and the wireless device 100 may be in wireless communication with any device that is capable of wirelessly communicating with the wireless device 100.

The base station 150 may communicate with the wireless device 100 using one or more communication bands or frequencies. For example, the base station 150 may communicate using a single band signal 152 to communicate with the wireless device 100. Alternatively, or in addition, the base station 150 may communicate using multiple communication bands via, for example, a carrier aggregation signal 154 that aggregates multiple communication bands together as part of a single communication signal. As illustrated by the thicker lightning bolt representative of the signal 154 compared to the thinner lightning bolt representative of the signal 152, the signal 154 may be comprised of multiple communication bands while the signal 152 may comprise a single communication band.

In some embodiments, a negotiation process between the base station 150 and the wireless device 100 may occur to determine which communication bands to use for communication between the wireless device 100 and the base station 150, and/or whether to use single band and/or CA communication. This negotiation may be based on the supported capabilities of the wireless device 100 and/or the base station 150, the utilization rate of the base station 150, whether the communication is for voice, data, or both, and any other factor that may impact the selected communication band(s) between the wireless device 100 and the base station 150. In certain embodiments, once it has been established whether CA will be used and the particular communication bands that will be used for communication between the wireless device 100 and the base station 150, the base station 150 may provide a command to the wireless device 100 identifying the communication band(s) to be used for communication. These command may then be used by, for example, the call processor 118 to configure various elements of the wireless device 100 including, for example, the diversity front end module 134. Some of the possible configuration options are described in more detail below with respect to the additional discussion of the diversity front-end modules.

Example Front-End Module

Figure 2A:
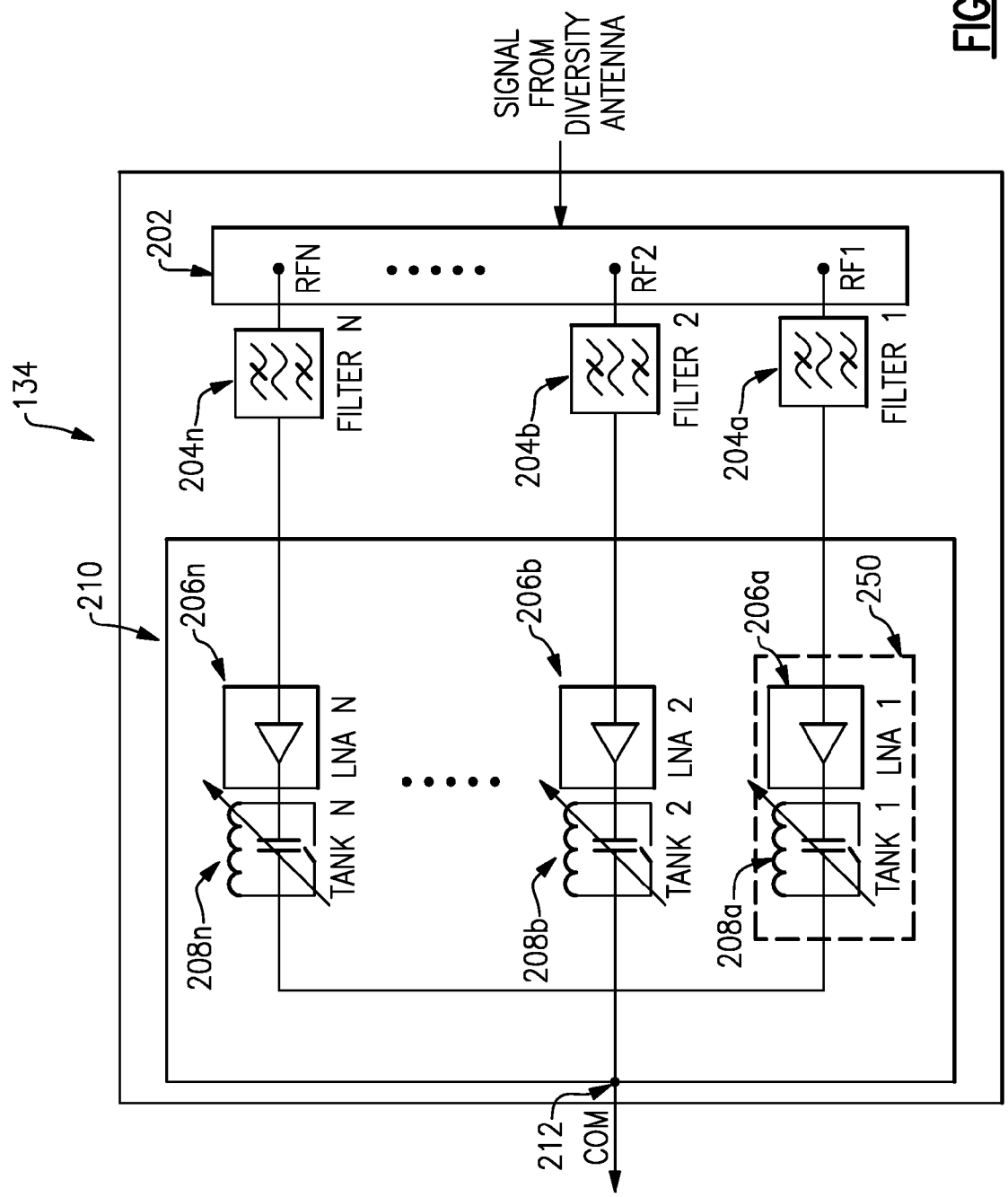
FIG. 2A is a block diagram of one example of the front end module that can be included in the wireless device of FIG. 1A.

FIG. 2A is a block diagram of one example of the diversity front end module 134 that can be included in the wireless device 100 of FIG. 1A. The diversity FEM 134 may receive one or more signals directly or indirectly from one or more antennas. For instance, the FEM 134 may receive a CA signal from a diversity antenna 136. In some implementations, a single signal of multiple frequency bands may be received by the diversity FEM 134. This signal may then be split into multiple signals of different frequency bands. Each of the multiple signals may then undergo additional processing. For example, the individual signals may be amplified by an LNA. After the multiple signals are processed, they may be recombined to form an aggregate signal across a wider bandwidth than each of the individual signals. The combined signal may be provided to another system, such as the transceiver 104, for further processing.

In some instances, the diversity FEM 134 may receive a single signal of a single communication or frequency band. In some such cases, some or all of the components of the diversity FEM 134 may operate in a bypass mode. Certain non-limiting embodiments of the bypass mode are described in further detail below with respect to FIG. 2B. In other cases, the signal may be amplified and/or undergo other signal conditioning and processing, but components relating to the splitting and recombining of the signal may operate in a bypass mode.

The diversity FEM 134 includes a diplexer or multiplexor network 202, which may receive a signal from an antenna, such as a signal from the diversity antenna 136. The signal may be a multiband signal or a single band signal. In the case that the signal is a single band signal, the multiplexor network 202 may provide the signal to a filter corresponding to the frequency band of the signal. For example, supposing that the signal is of a frequency associated with band 2 (e.g., approximately 1.96 GHz as in the case of 4G LTE) and that the filter 204b is a band pass filter configured to pass frequencies associated with band 2 and to block other frequencies, the multiplexor 202 may provide the signal to filter 204b. The filter 204b may filter out any noise or out-of-band signals included with the received signal. Further, the multiplexor 202 may function in a bypass or pass-through mode when the receive signal is a single band signal.

In the case where the received signal is a multiband signal, or a signal associated with multiple communication bands, the multiplexer 202 may divide the signal into its constituent bands. It should be understood that various multiband signals may comprise different bands and thus, not all of the illustrated signal paths of the diversity FEM 134 may be utilized for a particular signal. The multiplexor 202 can provide each signal corresponding to a particular communication band or frequency to a corresponding filter 204a, 204b, 204n. In some implementations, the multiplexor 202 divides the received multiband signal into multiple bands because the filters 204a-204n may not be capable of processing the entire bandwidth of the multiband signal. In other cases, the filters 204a-204n can be designed more efficiently across a narrower bandwidth than the bandwidth of the multiband signal As previously stated, the filters 204a, 204b, 204n may filter out any out-of-band signals included in the constituent signals of the multiband signal. Further, the filters may filter any noise, transmit signal interference, or other interference which is outside of the signal band. The filters 204a-204n can use any type of filter for filtering the noise or interference from a signal. For example, the filter may be a surface acoustic wave (SAW) filter or a bulk acoustic wave (BAW) filter. In one example use case, the multiband signal may include two signal bands. The multiplexor 202 may divide the signal into its constituent signal bands to obtain a first signal and a second signal. The multiplexor 202 may then provide the first signal to the filter 204a and the second signal to the filter 204b, or vice versa. The diversity FEM 134 can be configured to support any number of signal bands. Thus, the diversity FEM 134 can include any number of filters to process each of the signal bands. In some embodiments, the filters 204a-204n may be optional or omitted.

The diversity FEM 134 may further include a tunable integrous signal combiner 210. The tunable integrous signal combiner 210 is a signal combiner that can maintain the integrity of a set of one or more signals that are being processed. This processing may include signal amplification and noise removal, among other processing operations. Further, in the case where a plurality of signals are processed, the signal integrity may be maintained for the plurality of signals as they are combined after processing by the tunable integrous signal combiner 210. This, in certain embodiments, a plurality of signal or signal components may be amplified along one or more communication paths and then combined into a single multiband signal without reduced signal integrity due to noise or undesired signals or signal harmonics.

The tunable integrous signal combiner 210 amplifies the individual signal or frequency bands included in a CA signal while filtering out undesirable signals, such as noise for each of the individual signal bands. It should be understood that, in some instances, signals of a particular frequency may be considered noise for one signal path while being a desired frequency for another signal path. Further, in certain embodiments, the integrous signal combiner 210 can be tuned to process signals of different frequencies. Thus, the tunable integrous signal combiner 210 can be configured to process different CA signals that may be received from, for example, a base station. Although described as tunable, in certain implementations, the integrous signal combiner 210 may be application-specific and may not be tunable. However, in other implementations, the integrous signal combiner 210 is a tunable integrous signal combiner 210 that can be tuned to process different signal bands and different CA signals and/or bands.

The tunable integrous signal combiner 210 may include one or more low noise amplifiers (LNAs) 206a, 206b, 206n. Although only three LNAs are illustrated, it should be understood that the integrous signal combiner 210 may include any number of LNAs. For example, the integrous signal combiner 210 may include an LNA for each frequency band supported by the wireless device 100. Each LNA may receive and/or process (e.g., amplify) a signal associated with a particular frequency band. For example, the LNA 206a may receive a signal of a first band and the LNA 206b may receive a single of a second band. These signals may be received from the filters 204a-204n. For example the LNA 206a may receive a filtered signal from filter 204a and the LNA 206b may receive a filtered signal from filter 204b. Each of the LNAs 206a-206n can amplify the portion of the received signal provided by the corresponding filter 204a-204n. The LNAs may amplify signals that may be too weak for processing by the transceiver 104 to boost the signal such that the transceiver 104 can process the signal. In certain embodiments, particular LNAs associated with frequency bands of the multiband signal may be active, while other LNAs included in the diversity FEM 134 that are configured to amplify frequency bands not included in the multiband signal may be inactive or unused.

When amplifying a signal, the LNA may act as a broadband device. Thus, not only is the desired frequency band amplified, but so is any residual noise or interference from other bands. In certain embodiments, the noise or spurious signals may not impact the operation of the transceiver 104 that receives the output from the diversity FEM 134. For example, when the signal received from the antenna is of a single frequency or frequency band, the output of the LNA may be provided to the transceiver 104 without further processing.

However, in other embodiments, the noise or undesired amplified frequencies can impact operation of the transceiver 104. For example, in cases where the received signal is a multiband signal, the amplified noise from each LNA output may join together through, for example, superposition. In other words, each noise component for a particular frequency may add together causing noise at the particular frequency to reach an intensity level that can cause degradation in the performance of the transceiver 104.

To prevent this additive noise from interfering with operation of the transceiver 104, or other signal processing components of the wireless device 100, the tunable integrous signal combiner 210 includes a number of resonant filters or circuits 208a, 208b, 208n. Each of the resonant filters 208a-208n may be configurable LC filters. For example, the resonant filters 208a-208n may each include a network of switchable capacitors that may be controlled by, for example, the call processor 118 and/or based on the received signal(s). Moreover, the switchable capacitors may be configured based at least in part on a control signal received from an external source, such as a base station. In some cases, as illustrated in FIG. 2A, the resonant filters 208a-208n may be tank circuits. However, as previously described, it should be understood that the resonant circuits are not limited as such and can include other types of resonant circuits.

Each of the resonant filters 208a-208n can be configured to filter out signals associated with one or more frequency bands not being amplified or processed by the corresponding LNA 206a-206n in electrical communication with the resonant filters 208a-208n. Thus, for example, the resonant filter 208a, which is in electrical communication with the LNA 206a, may be configured to filter out frequencies that are not associated with the frequency band associated with or amplified by the LNA 206a. Therefore, each of the resonant filters 208a-208n can output an integrous signal that comprises an amplified version of the signal received by the corresponding LNA 206a-206n without or with a reduced noise signal. Thus, the output of the integrous signal combiner 210 is a more pure version of a signal received by the intergrous signal combiner 210 compared to signal combiners that do not include resonant circuits.

In some cases, the resonant filters 208a-208n serve as notch or bandpass filters that permit the frequency band associated with the corresponding LNA 206a-206n while filtering out all other frequencies. However, in certain implementations, the resonant filters 208a-208b are configured to filter out noise associated with the selected bands amplified by the active LNAs not in electrical communication with the particular resonant filters.

For instance, suppose that a multiband signal is received by the diversity FEM 134 that includes bands 1 and 3. The multiplexor 202 may split the signal into two components or signals, one signal corresponding to the band 1 frequency and one signal corresponding to the band 3 frequency. The band 1 signal may be provided to the LNA 206a, which can amplify the band 1 signal, and the band 3 signal may be provided to the LNA 206b, which can amplify the band 3 signal. In this particular example, the resonant circuit 208a may be configured to filter any noise associated with the band 3 signal. Similarly, the resonant circuit 208b may be configured to filter any noise associated with the band 1 signal.

The filtered and amplified signals output by the resonant circuits 208a-208n are combined at the node 212 to form an aggregate signal. This aggregate signal may be output to the transceiver 104. As previously described, some of the communication paths, and corresponding LNAs, in the diversity FEM 134 may be inactive. For instance, if the received multiband signal includes less frequency bands than supported by the wireless device 100, less than all of the LNAs may be active. In such cases, the aggregate signal at the node 212 may be formed from less than all of the LNA and resonant filter combinations. In some cases, such as when a non-CA signal is received by the wireless device 100 at the diversity antenna 136, the amplified signal output by the LNA that corresponds to the frequency of the signal may be provided to the node 212 for output from the tunable integrous signal combiner 210. Thus, in such cases, the signal is not an aggregate signal because, for example, there is only a single processed signal or frequency band.

As illustrated in FIG. 2A, the tunable integrous signal combiner 210 may be implemented as a single device that includes the LNAs 206a-206n and the resonant filters 208a-208n. However, in other implementations, the tunable integrous signal combiner 210 may be implemented as part of a multichip module (MCM). For example, the LNAs 206a-206n may be implemented in one chip or die and the resonant circuits 208a-208n may be implemented on another chip or die. As a second example, each LNA and corresponding resonant circuit pair may be implemented as a separate chip (e.g., amplification block 250), which can then be combined as a MCM to create the tunable integrous signal combiner 210.

In some embodiments, the diversity FEM 134 may be created on a single chip that includes the tunable integrous signal combiner 210 or as its own MCM that may include the tunable integrous signal combiner 210 as a single die or an MCM as well as a number of separate dies that correspond to the rest of the FEM's 134 components. In some implementations, the tunable integrous signal combiner 210, or components thereof, may be formed of a different material than other components of the tunable integrous signal combiner 210 or the diversity FEM 134. For example, the multiplexor 202 may be formed in silicon while while the tunable integrous signal combiner 210 210 may be formed in Silicon Germanium (SiGe).

As previously described, combining the multiple signals prior to the processing by the LNAs may result in a degradation of the signal and the signal to noise ratio (SNR) of the received signal. By amplifying the signal with the LNAs 206a-206n and post filtering with the resonant circuits 208a-208n, the degradation of the signal is reduced or prevented.

Often, the primary antennas 132 and the primary FEM 102 are located relatively close to the transceiver 104. For instance, the primary FEM 102 may be located next to the transceiver 104. As such, the signal paths between the primary FEM 102 and the transceiver 104 may be relatively short. For this reason, it may be unnecessary for the primary FEM 102 to include the resonant circuits described above with respect to the diversity FEM 134 and the resonant circuits may be omitted to reduce cost and packaging size of the FEM 102. However, in some embodiments, the wireless device may include the transceiver 104 closer to the diversity front end module 134. In such cases, the primary FEM 102 may include the resonant circuits and the diversity FEM 134 may omit the resonant circuits 208a-208n. In yet other implementations, both the primary FEM 102 and the diversity FEM 134 may be designed with the resonant circuits.

Example Bypass Mode

In certain embodiments, portions of the tunable integrous signal combiner 210 may operate in a bypass mode. For example, in cases where a received signal corresponds to a single communication band because, for example the signal from the base station 150 is not a CA signal. As another example, portions of the tunable integrous signal combiner 210 may operate in a bypass mode because the CA signal comprises communication bands processed by communication paths of the tunable integrous signal combiner 210 that are unlikely to introduce noise or cause parasitic loading with other communication paths of the tunable integrous signal combiner 210.

Figure 2B:
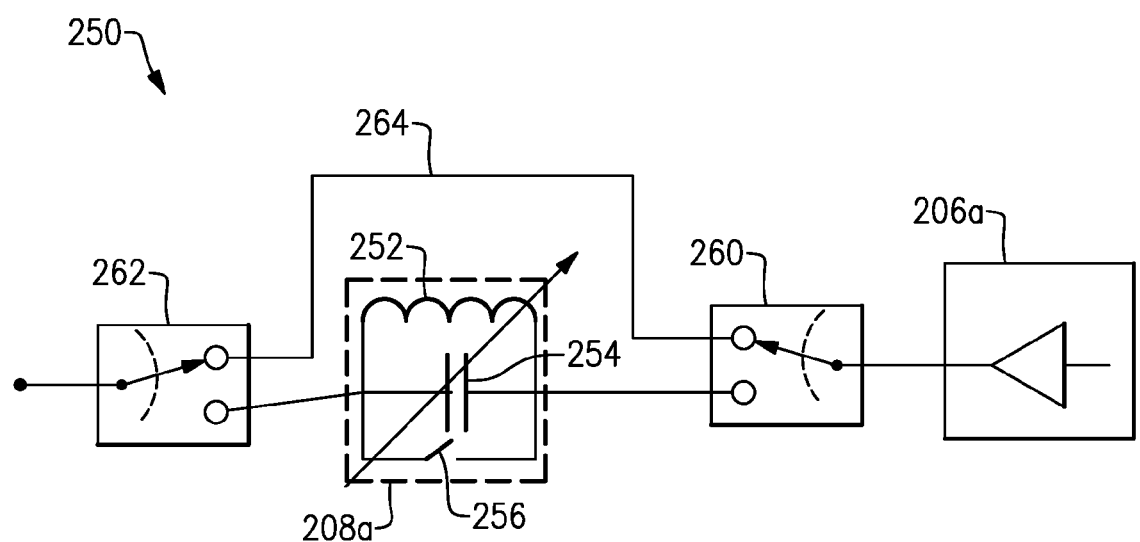
FIG. 2B is a block diagram of a portion of the front-end module of FIG. 2A.

FIG. 2B is a block diagram of a portion, the amplification block 250, of the front-end module 134 of FIG. 2A that illustrates several embodiments for implementing a bypass mode in response to a command from, for example, the call processor 118. This portion of the front-end module 134 may be one of the plurality of communication paths included in the tunable integrous signal combiner 210 and may be associated with a particular communication band or frequency.

Amplification block 250 includes an LNA 206a and a resonant circuit 208a. As previously described, the resonant circuit 208a may be an LC filter that includes an inductor 252 and a switch capacitor 254. Further, the resonant circuit may include a switch 256 that may be closed in response to a command from, for example, the call processor 118. This command may be responsive to a command from the base station 150 identifying the communication band(s) to be used for communicating between the wireless device 100 and the base station 150. Moreover, the switch 150 may be closed when the communication signal (e.g., the signal 154) does not include a frequency band associated with the LNA 206a and/or when the received signal is not a CA signal, but a single band signal (e.g., the signal 152).

As an alternative, or in addition, to the switch 256 included by the resonant circuit 208a, the amplification block 250 may include one or more switches before and/or after the resonant circuit 208a. For example, the switch 260 between the LNA 206a and the resonant circuit 208a can control whether a signal is provided from the LNA 206a to the resonant circuit 208a or to a bypass path 264 that bypasses the resonant circuit 208a. As another example, the switch 262 between the resonant circuit 208a and the path to the combiner (e.g., the node 212 of FIG. 2A) can control whether a signal is provided to the combiner from the resonant circuit 208a or the bypass path 264. Advantageously, in certain embodiments, bypassing the resonant circuit 208a can result in lower insertion loss. Thus, when operating in a single band mode or when receiving a CA signal with certain frequency bands, it can be advantageous to bypass the resonant circuit 208a. In other embodiments, the use of the resonant circuit 208a can result in reduced or eliminated noise and parasitic loading. Moreover, in certain embodiments, when receiving a single band signal, a combiner at the output of the tunable integrous single combiner 210 (e.g., at node 212) that combines the outputs of each of the amplification blocks may be bypassed resulting in lower insertion loss.

In certain implementations, each of the amplification blocks comprising the LNAs and the resonant circuits can include one or more of the switches 256, 260, and 262. Further, each of the communication paths of the tunable integrous signal combiner 210 may include an amplification block that is configured the same as the amplification block 250. Alternatively, at least some of the amplification blocks may be configured differently.

Second Example Front-End Module

Figure 3:
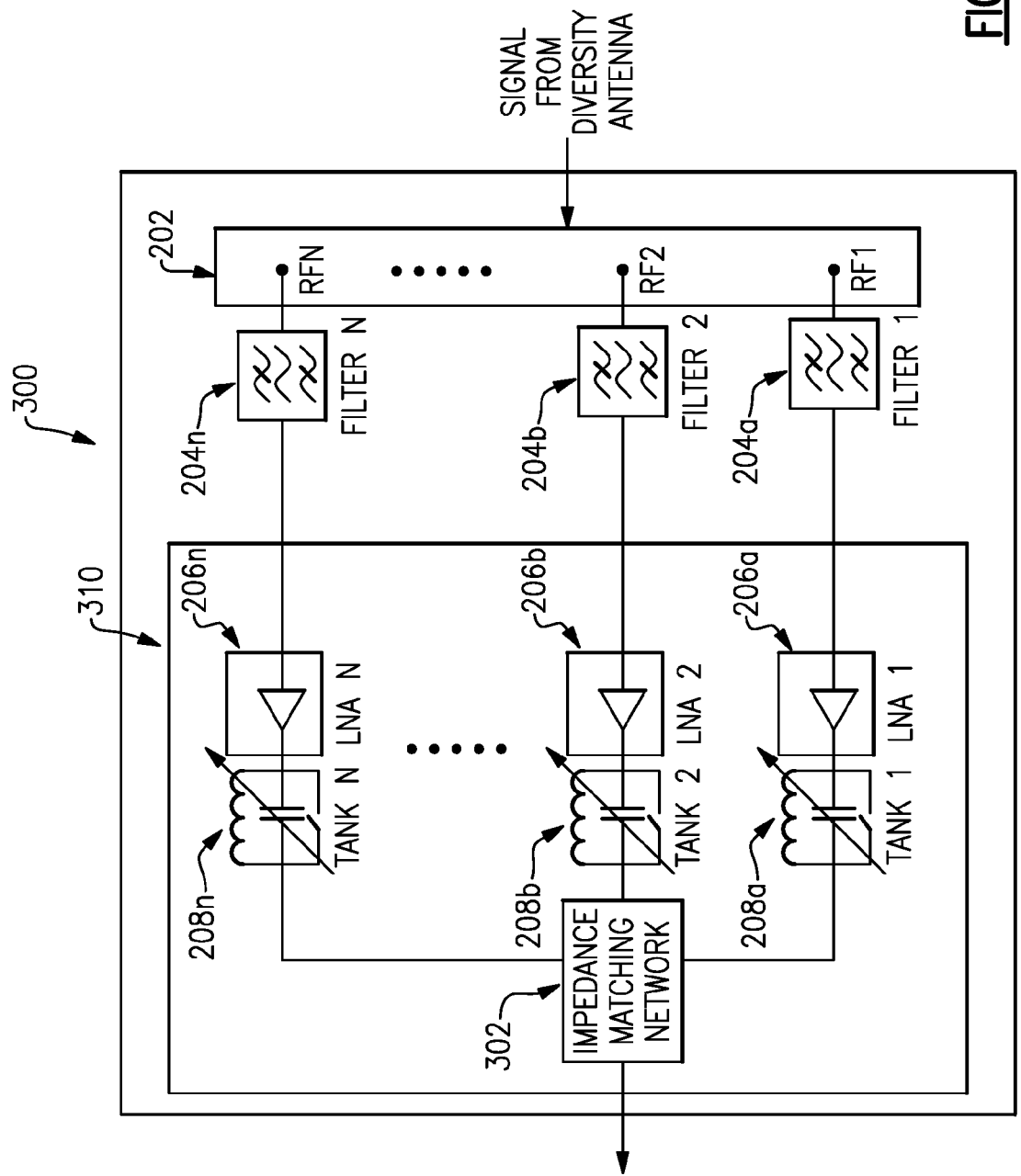
FIG. 3 is a block diagram of another example of the front end module that can be included in the wireless device of FIG. 1A.

FIG. 3 is a block diagram of another example of a front end module 300 that can be included in the wireless device 100 of FIG. 1A. The FEM 300 can include a number of the components of the diversity FEM 134 previously described with respect to FIG. 2A. Thus, reference numbers from FIG. 2A are re-used in FIG. 3 to indicate correspondence between referenced elements.

In addition to the elements previously described with respect to FIG. 2A, the FEM 300 may include an impedance matching network 302. This impedance matching network 302 may be used to facilitate combining the signals output by the one or more resonant circuits 208a-208n. Further, the impedance matching network 302 may be configured to match an impedance of the output of the tunable integrous signal combiner 310 to the impedance of an element in electrical communication with the FEM 300, such as the transceiver 104. As illustrated, the impedance matching network 302 may be part of tunable integrous signal combiner 310. Further, the impedance matching network 302 may be implemented on the same component, die, or as part of the same circuitry as the tunable integrous signal combiner 310 or, in implementations where the tunable integrous signal combiner 310 is part of a MCM, the impedance matching network 302 may be implemented as part of a separate module that is separate from at least some other components of the tunable integrous signal combiner 310.

As yet another alternative, the impedance matching network 302 may be implemented on a separate component from the tunable integrous signal combiner 310. Thus, in some such cases, an output of the tunable integrous signal combiner 310 may be provided as an input to the impedance matching network 302, which may in turn output a signal from the FEM 300 to a subsequent system, such as a transceiver 104. In some implementations where the impedance matching network 302 is external to the tunable integrous signal combiner 310, the signals processed by the LNA and/or resonator circuits of the tunable integrous signal combiner 310 may be aggregated before being output by the tunable integrous signal combiner 310 and provided to the impedance matching network 302. In other implementations, the tunable integrous signal combiner 310 may have multiple outputs with each output corresponding to LNA/resonant circuit signal path. Each of the outputs may then be provided to the impedance matching network 302, which may perform the aggregation of the signals output by the tunable integrous signal combiner 310 before providing the aggregated signal as an output of the FEM 300.

As previously described, the combination of communication paths used to perform carrier aggregation can result in parasitic loading. In some implementations, the resonant circuits 208a-208n may be used to reduce or eliminate parasitic loading by, for example, adjusting the impedance on the output line of the respective LNAs 206a-206. Alternatively, or in addition, the parasitic loading can be reduced or eliminated by using the impedance matching network 302. The impedance matching network 302 can be configured to raise, or otherwise modify, the impedance of the output line of the LNAs to counter any reduction in impedance due to the parallel configuration of the communication paths within the tunable integrous signal combiner 310. Further, the impedance matching network 302 can be used to match the impedance of the aggregate communication path between the diversity FEM 300 and a subsequent system, such as the transceiver 104.

In some cases, the impedance matching network 302 can be bypassed. For example, in cases where a single band signal is received, it may be unnecessary to adjust the impedance of the communication path because, for example, all but one communication path may also be configured in a bypass mode.

In certain embodiments, the impedance matching network 302 may be a dynamic impedance matching network. Advantageously, in certain embodiments, using a dynamic impedance matching network 302 enables the impedance to be adjusted or matched based on the one or more LNA and/or resonant circuits that are active. One example of a tunable impedance matching network that can be adapted for use with certain embodiments described herein is described in U.S. application Ser. No. 14/314,550, filed on Jun. 25, 2014 and titled "FLEXIBLE L-NETWORK ANTENNA TUNER CIRCUIT," which is hereby incorporated herein by reference in its entirety for all purposes. Another example of an impedance matching network that can be adapted for use with certain embodiments described herein is described in U.S. application Ser. No. 14/869,041, filed on Sep. 29, 2015 and titled "AUTOMATIC IMPEDANCE MATCHING USING TRUE POWER INFORMATION," which is hereby incorporated herein by reference in its entirety for all purposes.

In addition to matching the impedance of the output lines of the active LNAs 206a-206n and/or the active resonant circuits 208a-208n, the impedance matching network 302 may combine the signals output by the active LNAs 206a-206n and/or the active resonant circuits 208a-208n to create the aggregate carrier signal. The impedance matching network 302 can provide this aggregate carrier signal to the transceiver 104. Further, the impedance matching network 302 may match the impedance of the tunable integrous signal combiner 310 to the transceiver 104.

Example Resonant Circuit Schematics

FIGS. 4A-4D are circuit schematics of examples of resonant circuits 400, 410, 420, and 430 that can be included in the front end modules of FIGS. 2A and 3. In some embodiments, each of the resonant circuits 400, 410, 420, and 430 are separate resonant circuits that can be electrically connected to one or more of the LNAs of FIGS. 2A and 3. The resonant circuits 400, 410, 420, and 430, in some cases, may each be statically connected to different LNAs. Alternatively, a switching network may be used to connect one or more of the resonant circuits 400, 410, 420, and 430 to a particular LNA. A control circuit included with the FEM 134 may determine which LNA to electrically connect to a particular resonant circuit (or vice versa) based on the bandwidth of a received signal. Alternatively, the call processor 118 may make this determination.

In some embodiments, the resonant circuits 400, 410, 420, and 430 may each represent different configurations of a single resonant circuit. In other words, the capacitor of the resonant circuits 400, 410, 420, and 430 may be a set of switchable capacitors that can be electrically connected or disconnected from the resonant circuit based on the received signal, a command received from an external device (e.g., a base station), or the frequency band(s) processed by a particular one or more LNAs.

The frequency bands filtered by each of the resonant circuits 400, 410, 420, and 430 are summarized in the below Table 1, which also includes an operating frequency for the associated communication band.

TABLE 1

Figure 4A:
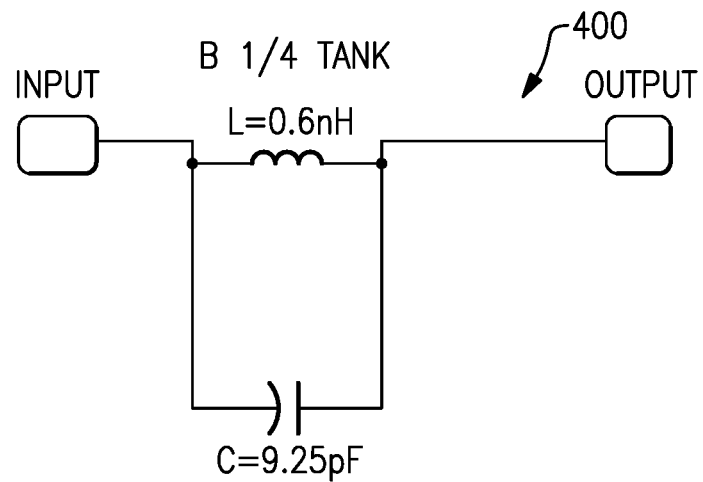
FIGS. 4A-4D are circuit schematics of examples of resonant circuits that can be included in the front end modules of FIGS. 2A and 3.
Figure 4B:
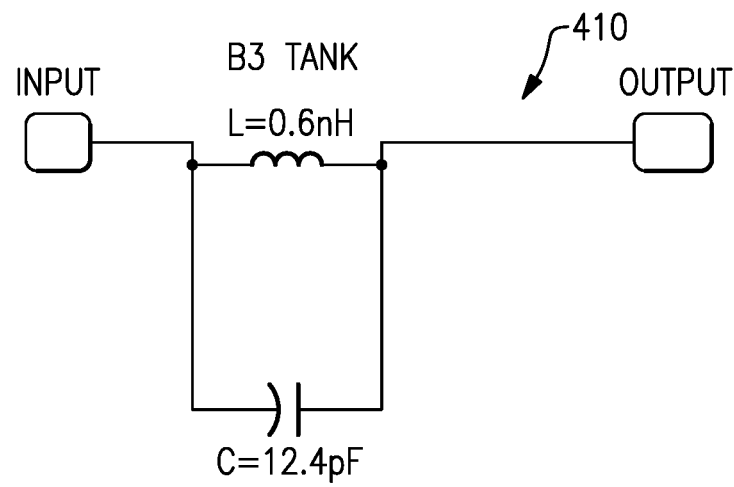
Figure 4C:
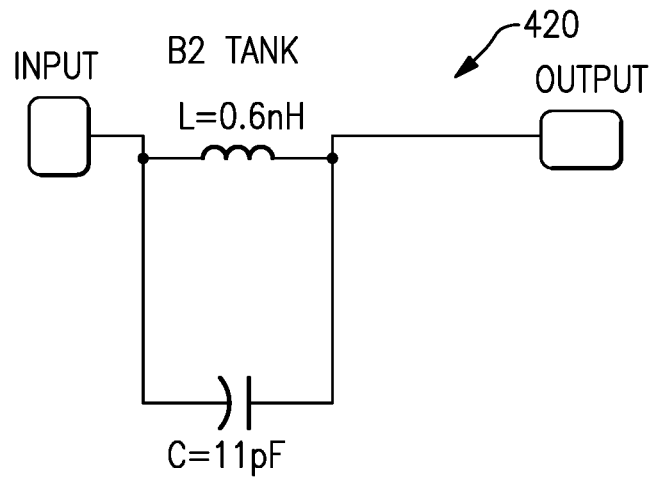
Figure 4D:
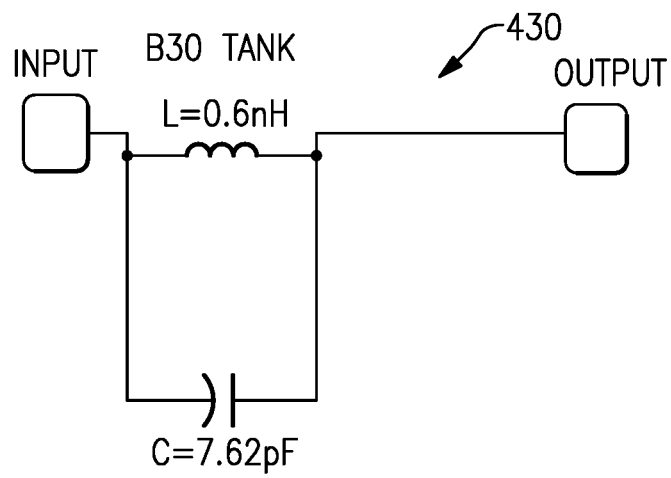

|  | FIG. 4A<br>B1/4 | FIG. 4B<br>B3 | FIG. 4C<br>B2 | FIG. 4D<br>B30 |
| --- | --- | --- | --- | --- |
| C(pF) | 9.25 | 12.4 | 11 | 7.62 |
| L(nH) | 0.6 | 0.6 | 0.6 | 0.6 |
| Freq. (GHz) | 2.14 | 1.85 | 1.96 | 2.35 |

The resonant circuit 400 of FIG. 4A is configured to filter frequencies associated with bands 1 and 4. The capacitor of resonant circuit 400 is configured to be 9.25 pF with an inductor of 0.6 nH. As indicated in Table 1, the resonant circuit 400 can be utilized with multiple bands. This is possible because the frequency band of band 1 and 4 are very similar. The middle downlink frequency of band 1 is 2.140 GHz and the middle downlink frequency of band 4 is 2.1325 GHz. Advantageously, in certain embodiments, the resonant circuit 400 may be used in cases where band 1, band 4, or band 1 and band 4 are included as part of the received multiband signal.

The resonant circuit 410 of FIG. 4B is configured to filter frequencies associated with band 3. The capacitor of resonant circuit 410 is configured to be 12.4 pF with an inductor of 0.6 nH. Further, the resonant circuit 420 of FIG. 4C is configured to filter frequencies associated with band 2. The capacitor of resonant circuit 420 is configured to be 11 pF with an inductor of 0.6 nH. Moreover, the resonant circuit 430 of FIG. 4D is configured to filter frequencies associated with band 30. The capacitor of resonant circuit 430 is configured to be 7.62 pF with an inductor of 0.6 nH.

As described, the inductors of each of the resonant circuits may be configured with the same inductance, and the capacitors may be varied to filter or process different communication bands. However, in some embodiments, the capacitors may be of the same value and the inductors may be varied. In yet other implementations, both the capacitors and inductors may be varied. Thus, in some embodiments, one or more of the resonant circuits 400, 410, 420, or 430 may be tunable. Thus, one or more of the capacitors and/or inductors of one or more of the resonant circuits may be adjustable based, for example, on a received signal, a command from a component internal to the wireless device 100 (e.g., the call processor 118), and/or a command from an external component (e.g., a base station). In order for the resonant circuits to be tunable, the capacitors and/or inductors of the resonant circuits may be reconfigurable. For example, the capacitors may be switch capacitors that can be modified by, for example, opening or closing particular switches of the switch capacitor.

In certain embodiments, two or more resonant circuits can be tiered or connected in series enabling the rejection of multiple bands on differing frequency bands. Thus, for example, a LNA configured to amplify band 2 can be connected with a resonant circuit 400 and a resonant circuit 410 to reject signals of bands 1, 3, and 4. The output signal can in turn be combined with the output signals of LNAs configured to amplify bands 1, 3, and 4, which are connected in series to the resonant circuit 420, which rejects signals of band 2.

Resonant Circuit Simulations

Figure 5A:
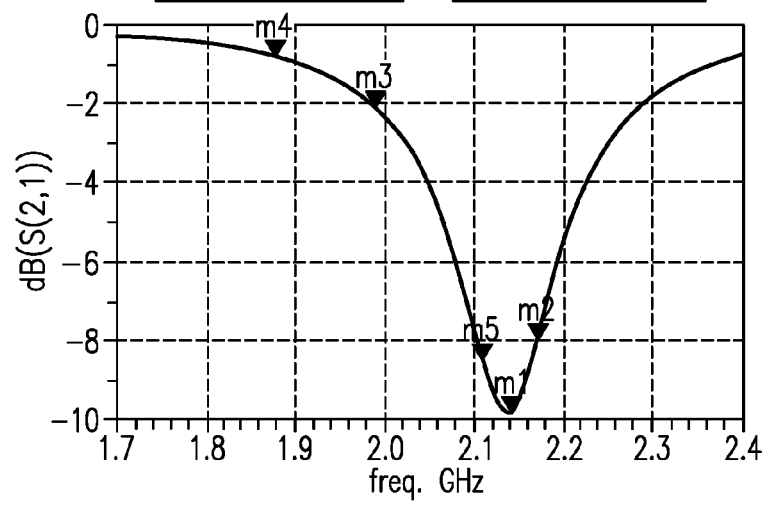
FIGS. 5A-5D graphically illustrate simulations of a resonant circuit for different bands of operation.

FIGS. 5A-5D graphically illustrate simulations demonstrating a result of applying the resonant circuits 400, 410, 420, and 430 to a signal output by an LNA to filter noise for different bands of operation. FIG. 5A is a simulation of the resonant circuit 400 as applied to an LNA configured to process a band 2 or band 3 signal frequency. In other words, FIG. 5A illustrates the result of processing a signal by an LNA designed to amplify band 2 and band 3 signals electrically connected in series with the resonant circuit 400 configured to filter out signals associated with bands 1 and 4. Point m1 in the graph of FIG. 5A represents the central downlink frequency for band 1 and points m2 and m5 represent the low and high frequency points. As illustrated by the graph at point m1, the rejection at the center frequency of band 1 is about −9.749 dB. Further, the rejection at the high frequency point of band 1 is −7.950 dB compared to a loss at the high frequency components of bands 2 and 3, which is 0.834 and 2.104 dB, respectively.

As indicated by the points m3 and m4, the resonant circuit 400 can have some impact on the desired signal to be passed to the transceiver 104. However, the impact is relatively small and the band 2 and band 3 signals remain strong enough for processing by the transceiver 104. In some cases, the LNA can be configured to provide a greater amplification factor to the received band 2/3 signal to account for the loss due to the resonant circuit. In some implementations, the resonant circuit is configured to operate in a bypass mode when a single band signal is received. Advantageously, by configuring the resonant circuit to operate in a bypass mode when the signal is a single band signal, loss due to the resonant circuit is eliminated. Similarly, the resonant circuit may operate in a bypass mode when a multiband signal is composed of frequencies that are more than a threshold apart from each other.

Figure 5B:
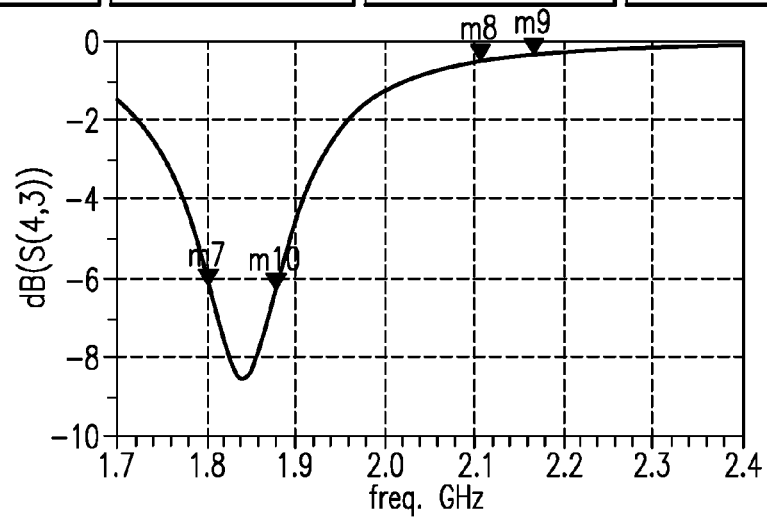

FIG. 5B is a simulation of the resonant circuit 410 as applied to an LNA configured to process a band 1 signal frequency. As can be seen by points m7 and m10, the frequencies associated with band 3 are rejected while the signals associated with band 1 are primarily passed through as indicated by points m8 and m9, which represent the low and high frequency points of band 1 respectively. Thus, looking at FIGS. 5A and 5B in conjunction, a multiband signal composed of a band 1 signal and a band 3 signal can be divided into two separate signals by multiplexor 202. The band 1 signal may be provided to an LNA configured to amplify the band 1 signal, which may be connected in series to the resonant circuit 410, which will filter any noise relating to band 3. Similarly, the band 3 signal may be provided to an LNA configured to amplify the band 3 signal, which may be connected in series to the resonant circuit 400, which will filter any noise relating to band 1. The two signals may then be recombined before being provided to the transceiver 104 for further processing.

Figure 5C:
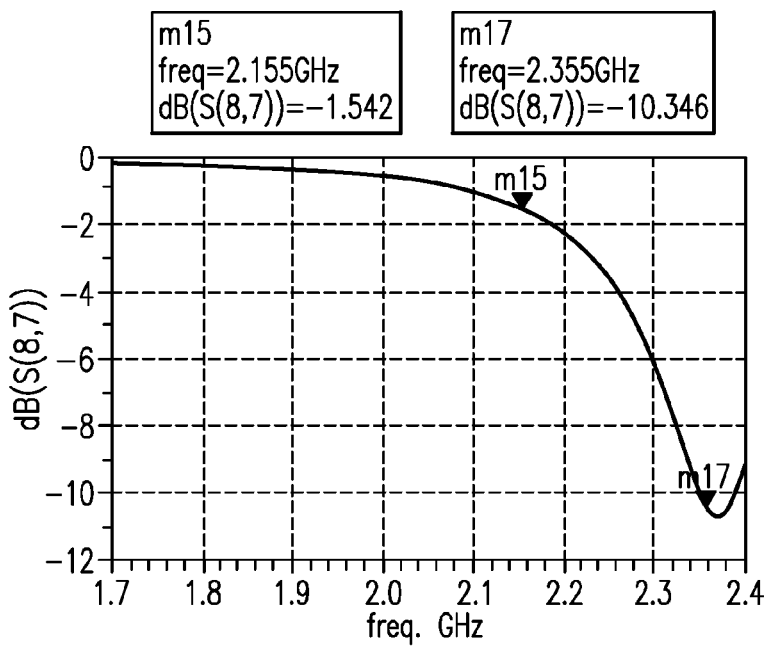

FIG. 5C is a simulation of the resonant circuit 430 as applied to an LNA configured to process a band 4 signal frequency. The point m17 represents the middle frequency for band 30, which indicates a rejection of about 10.5 dB. Conversely, the point m15 associated with the band 4 high frequency indicates a loss of only about 1.5 dB.

Figure 5D:
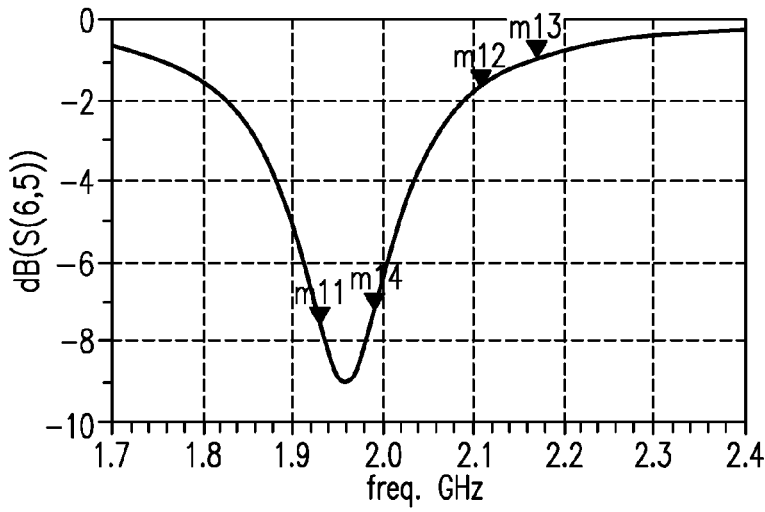

FIG. 5D is a simulation of the resonant circuit 420 as applied to an LNA configured to process a band 1 signal frequency. The points m11 and m14 represents the low and high frequency respectively for band 2, which indicates a rejection of over 7 dB. Conversely, the points m12 and m13 associated with the band 1 low and high frequency respectively indicate a loss of 1.6 dB or less.

Example FEM Circuit Schematic

Figure 6:
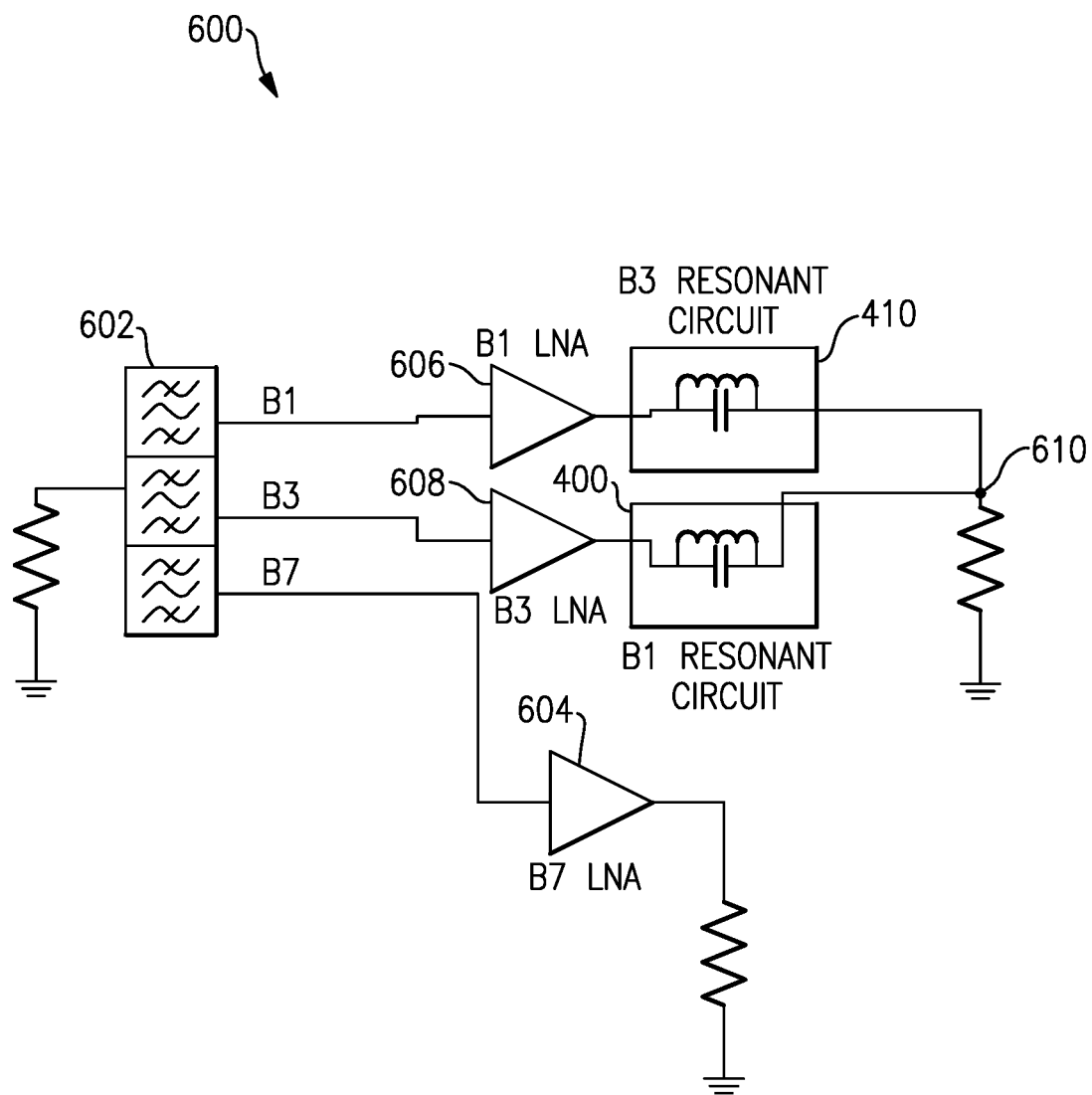
FIG. 6 is a circuit schematic of one example of the front end module that can be included in the wireless device of FIG. 1A.

FIG. 6 is a circuit schematic 600 of one example of the front end module 102 that can be included in the wireless device 100 of FIG. 1A. The circuit schematic 600 includes a filter 602, such as a triplexer that can be used to divide a multiband signal into its constituent frequency bands. In this particular example, the filter 602 splits a multiband signal composed of a band 1 signal, a band 3 signal, and a band 7 signal. The filter 602 may include any type of filter. For example, the filter 602 may be a SAW filter or a BAW filter.

In certain embodiments, one band may be treated distinctly from the other bands because, for example, the frequency is different enough that there is minimal interference between the band and the other bands of the multiband signal. For example, the band 7 may be processed separately from bands 1 and 3 because band 7 is relatively distant from band 1 (approximately 450 MHz), and even more so from band 3 (approximately 740 MHz), compared to the distance between bands 1 and 3. Thus, the amount of interference between bands 1 and 3, and band 7 is sufficiently low enough to omit a resonant circuit, which can add its own loss. As such, band 7 is processed separately by a circuit 604. The details of this circuit 604 are omitted as beyond the scope of the present disclosure and thus circuit 604 is represented as a 50Ω impedance. It should be appreciated that in some embodiments, band 7 could be processed similarly to bands 1 and 3 using an LNA and resonant circuit combination.

The circuit schematic 600 may further includes an LNA 606 for processing or amplifying the band 1 signal and an LNA 608 for processing or amplifying the band 3 signal. Each of the LNAs 606 and 608 can be represented by a scattering parameter (S2P) model.

The outputs of the LNAs 606 and 608 are provided to the resonant circuits 410 and 400, respectively. As previously described, the resonant circuit 410 can filter or reject frequencies relating to the band 3 communication band. Similarly, the resonant circuit 400 can filter or reject frequencies relating to the band 1 communication band. The amplified and filtered communication bands are recombined at node 610, which may be output to a subsequent element, such as the transceiver 104. This subsequent device element is represented by the resistor subsequent to the node 610, which can further be represented by a particular impedance, such as a 50Ω impedance.

Simulations of an FEM

Figure 7A:
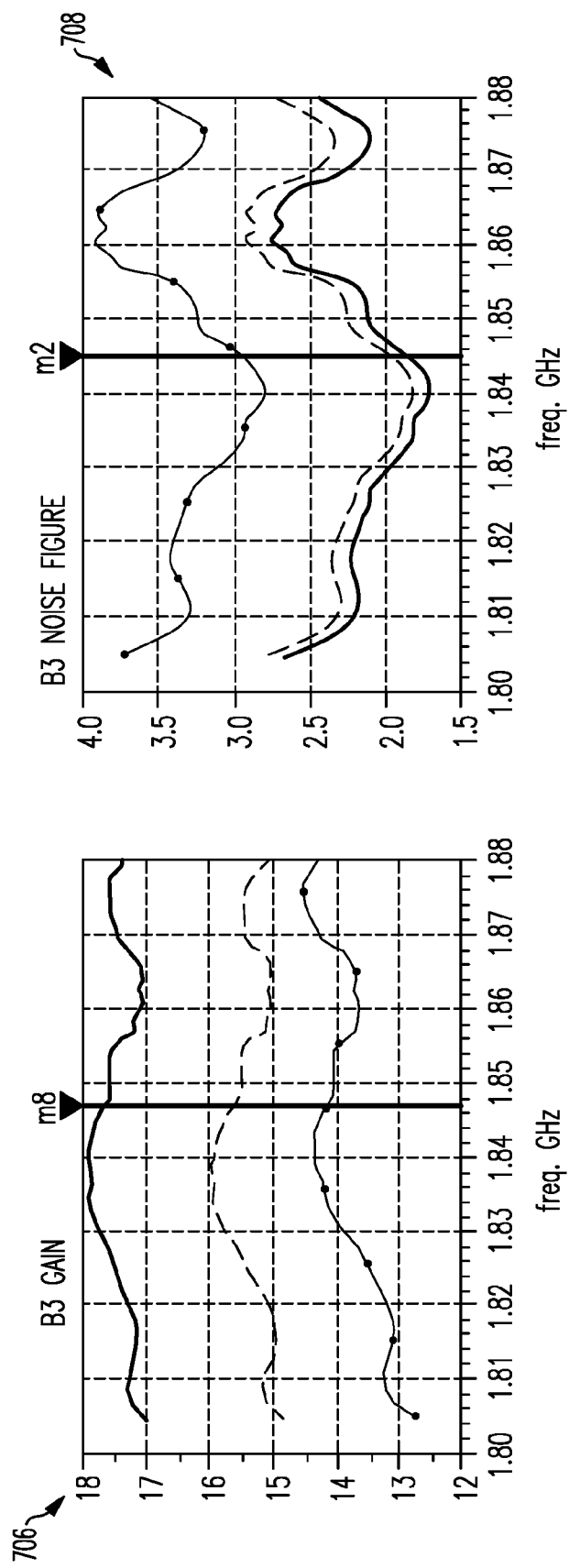
FIGS. 7A and 7B graphically illustrate simulations of Gain and Noise Figure for the circuit schematic of FIG. 6.
Figure 7B:
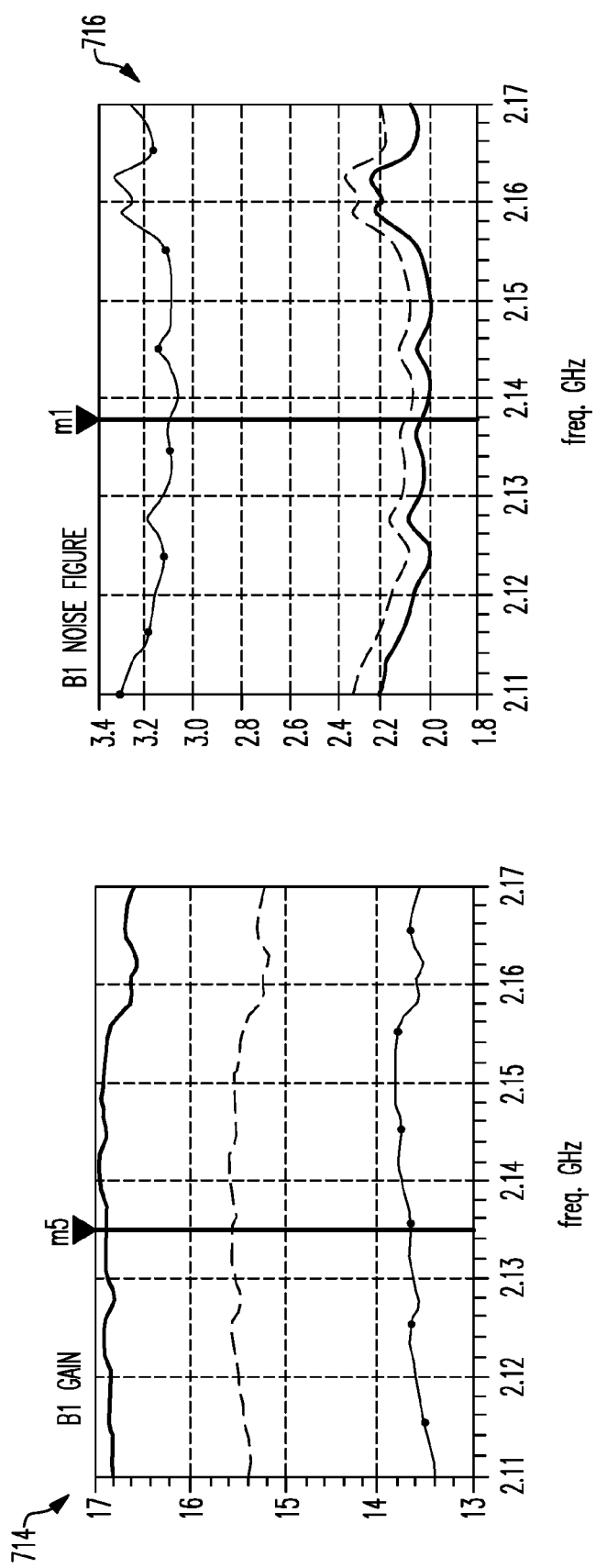

FIGS. 7A and 7B graphically illustrate simulations for the circuit schematic 600 of FIG. 6. More specifically, FIGS. 7A and 7B illustrate comparisons for two different bands between a single band operation, a multiband operation without using resonant circuits, and a multiband operation with the use of resonant circuits.

FIG. 7A illustrates the results for processing a band 3 signal. In each of the graphs, the solid line represents single band processing for band 3. In other words, the solid line represents the case where a single band signal is received by an antenna of the wireless device and no carrier aggregation is performed. Further, in each of the graphs, the solid line with the dots represents when carrier aggregation is performed that includes band 3, but does not use a resonant circuit. The dashed line represents when carrier aggregation is performed that includes a band 3 signal and uses a resonant circuit.

Examining the gain in graph 706, we see that the gain using the resonant circuit is better than when carrier aggregation is used without the use of a resonant circuit. However, the resonant circuit does introduce some loss. Thus, in certain embodiments, when a non-multiband signal is received, the resonant circuit can be bypassed or operated in a bypass mode resulting in improved gain.

Further, examining the noise figure graph 708, we can see that carrier aggregation without the use of resonant circuits results in greater noise. However, when resonant circuits are used, the noise level of the aggregate carrier signal approaches that of a single band signal.

FIG. 7B illustrates the results for processing a band 1 signal. As with FIG. 7A, in each of the graphs, the solid line represents single band processing for band 1. In other words, the solid line represents the case where a single band signal is received by an antenna of the wireless device and carrier aggregation is not performed. Further, in each of the graphs, the solid line with the dots represents when carrier aggregation is performed that includes band 1, but does not use a resonant circuit. The line dashed line represents when carrier aggregation is performed that includes a band 1 signal and uses a resonant circuit.

Moreover, as with the graph 706, the graph 714 illustrates less of a gain loss when using a resonant circuit compared to not using a resonant circuit for a multiband signal. Further, turning to graph 716, the noise figure when using the resonant circuit is close to the single band case and is much improved compared to carrier aggregation without a resonant circuit.

Example Multiband Signal Processing Process

Figure 8:
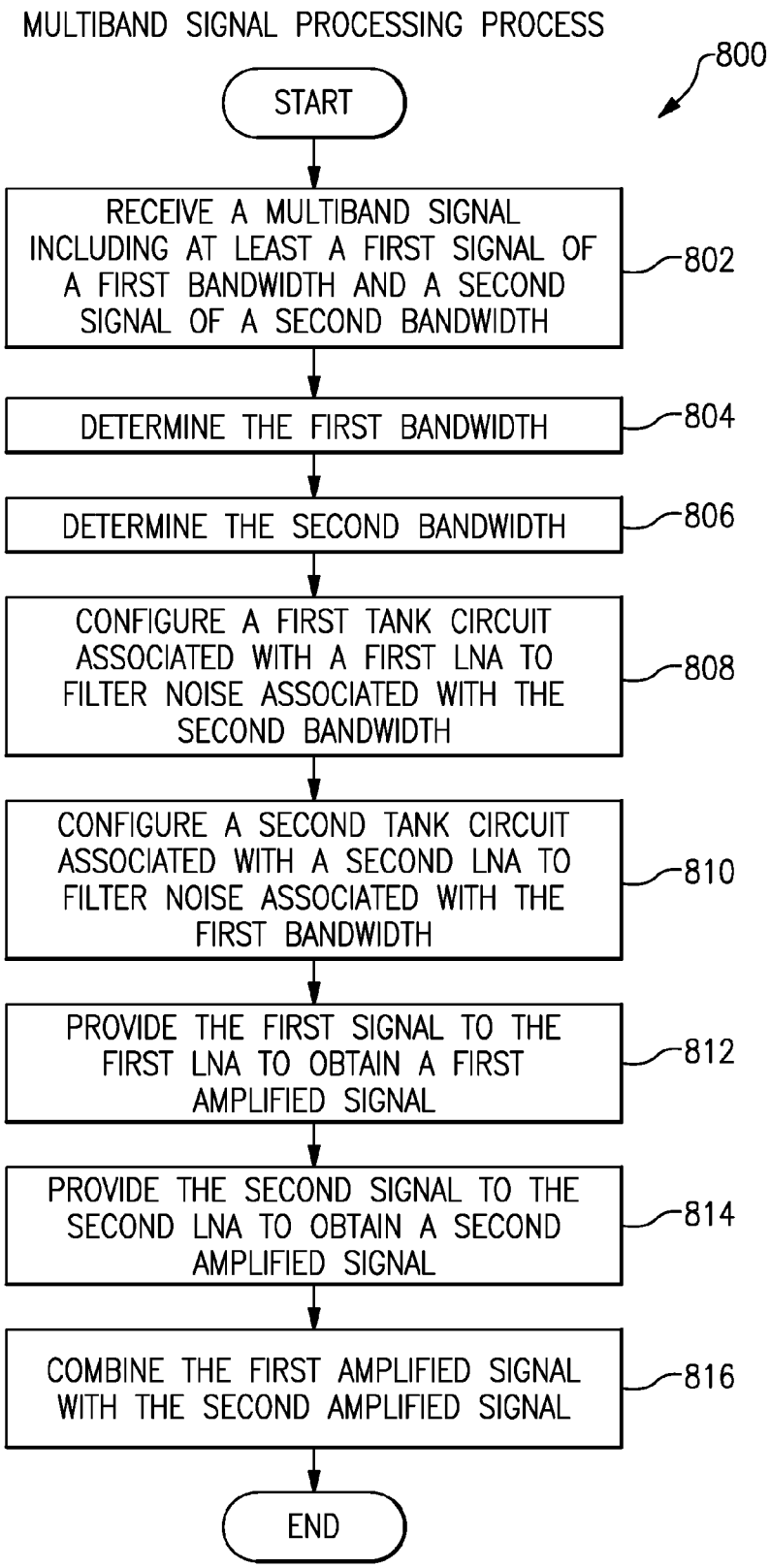
FIG. 8 is a flowchart of one example of a multiband signal processing process for performing signal aggregation.

FIG. 8 is a flowchart of one example of a multiband signal processing process 800 for performing signal aggregation. It should be understood that the process 800 is one example of a process for performing carrier aggregation in response to receiving a multiband signal. Other processes for processing a multiband signal are possible. For example, operations of the process 800 may be performed in a different order or substantially in parallel. Thus, the order of the operations described with respect to the process 800 is for ease of description and not to limit the process 800. Moreover, it should be understood that a variety of systems, including a variety of hardware, software, firmware, or a combination thereof can implement at least portions of the process 800. For example, the process 800 may be performed, at least in part, by the call processor 118, the diversity FEM 134, or the transceiver 104, or combinations of the same, and so forth.

To simplify discussion and not to limit the present disclosure, the process 800 will be described with respect to particular systems.

The process 800 may begin when, for example, the wireless device 100 receives a multiband signal including at least a first signal of a first bandwidth and a second signal of a second bandwidth at block 802. Although the multiband signal is described as being a dual band signal, it is possible for the multiband signal to be tri-band or to include any other number of frequency bands. Further, the received multiband signal may be received at one or more primary antennas 132 and/or diversity antennas 136 of the wireless device 100. The multiband signal may be received from a base station or other system that can wirelessly communicate with the wireless device 100.

At block 804, a controller, such as the call processor 118, determines a bandwidth or a frequency band of the first signal of the multiband signal. In some cases, the communication band is determined based on the received signal. In other cases, the communication band may be determined based on a previous received signal or data packet. In some cases, the base station informs the wireless device of the communication bands to be received. At block 806, the communication band for the second signal is determined.

At block 808, a first resonant circuit associated with a first LNA is configured to filter noise associated with the second bandwidth or communication band determined at the block 806. Similarly, at block 810, a second resonant circuit associated with a second LNA is configured to filter noise associated with the first bandwidth or communication band determined at the block 804. The resonant circuits may be dynamically configured by electrically connecting or disconnecting one or more switched capacitors from the respective LNAs. In some cases, the resonant circuit configurations are static, but the resonant circuits that are in electrical communication with the LNA can be adjusted. In other words, although the resonant circuit's configuration may be static, a controller can electrically connect or disconnect particular resonant circuits from a particular LNA.

The first signal is provided to the first LNA at block 812 to obtain a first amplified signal. Similarly, the second signal is provided to the second LNA at block 814 to obtain a second amplified signal. Further, at the block 812, the resonant circuit in electrical communication with the first LNA filters out components of the first amplified signal associated with the second communication band. Similarly, at the block 814, the resonant circuit in electrical communication with the second LNA filters out components of the second amplified signal associated with the first communication band.

The first amplified signal and the second amplified signal may be combined at the block 816. Combining the amplified signals may include combining the filtered versions of the amplified signals. Moreover, in certain embodiments, combining the amplified signals may include using an impedance matching network 302 to match the impedance between the communication path of the first signal and the communication path of the second signal. In addition, the impedance matching network may match the impedance of the two communication paths to an output line that provided the aggregated signal to, for example, the transceiver 104.

In certain embodiments, the process 800 can include processing a single band signal. In such cases, the LNA associated with the bandwidth of the received signal may be disconnected from its corresponding resonant circuit. Alternatively, the corresponding resonant circuit may be configured in a bypass mode that allows the signal to pass through without filtering the amplified signal received from the LNA.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The term "coupled" is used to refer to the connection between two elements, the term refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the inventions are not intended to be exhaustive or to limit the inventions to the precise form disclosed above. While specific embodiments of, and examples for, the inventions are described above for illustrative purposes, various equivalent modifications are possible within the scope of the inventions, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the inventions provided herein can be applied to other systems, not necessarily the system described above. The elements and acts of the various embodiments described above can be combined to provide further embodiments.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An integrous signal combiner comprising:
    a plurality of inputs, each input configured to receive a signal of a different frequency than the other inputs of the plurality of inputs;
    an output configured to provide an integrous signal to a subsequent processing block;
    a plurality of low noise amplifiers;
    a plurality of resonant circuits, each resonant circuit corresponding to a different low noise amplifier from the plurality of low noise amplifiers; and
    a combiner configured to combine a plurality of integrous signals, each of the integrous signals from the plurality of integrous signals output by a different resonant circuit from the plurality of resonant circuits.

2. The integrous signal combiner of claim 1 wherein the subsequent processing block is a transceiver.

3. The integrous signal combiner of claim 1 wherein the integrous signal is a combined signal created from a plurality of communication bands.

4. The integrous signal combiner of claim 1 wherein the integrous signal is formed from a single communication band.

5. An integrous signal combiner comprising:
    a plurality of inputs, each input configured to receive a signal of a different frequency than the other inputs of the plurality of inputs;
    an output configured to provide an integrous signal to a subsequent processing block;
    a plurality of low noise amplifiers; and
    a plurality of resonant circuits, each resonant circuit corresponding to a different low noise amplifier from the plurality of low noise amplifiers, at least one resonant circuit from the plurality of resonant circuits including a switch that when closed causes the at least one resonant circuit to be bypassed.

6. An integrous signal combiner comprising:
    a plurality of inputs, each input configured to receive a signal of a different frequency than the other inputs of the plurality of inputs;
    an output configured to provide an integrous signal to a subsequent processing block;
    a plurality of low noise amplifiers;
    a plurality of resonant circuits, each resonant circuit corresponding to a different low noise amplifier from the plurality of low noise amplifiers; and a switch between a low noise amplifier from the plurality of low noise amplifiers and a corresponding resonant circuit from the plurality of resonant circuits, the switch configured to switch between the corresponding resonant circuit and a bypass path that bypasses the corresponding resonant circuit.

7. An integrous signal combiner comprising:
a plurality of inputs, each input configured to receive a signal of a different frequency than the other inputs of the plurality of inputs;
an output configured to provide an integrous signal to a subsequent processing block;
a plurality of low noise amplifiers; and
a plurality of resonant circuits, each resonant circuit corresponding to a different low noise amplifier from the plurality of low noise amplifiers, at least one resonant circuit from the plurality of resonant circuits including a switched capacitor enabling the at least one resonant circuit to be dynamically adjusted.

8. A front-end module comprising:
a multiplexer network configured to receive a signal from a diversity antenna and to split the signal into a plurality of signal portions corresponding to a plurality of communication bands;
an integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, and a plurality of resonant circuits, each resonant circuit corresponding to a different low noise amplifier from the plurality of low noise amplifiers; and
a plurality of filters positioned between the multiplexer network and the integrous signal combiner, each filter from the plurality of filters receiving a different signal portion from the plurality of signal portions and configured to remove out-of-band signals from the received signal portion.

9. The front-end module of claim 8 wherein the integrous signal is a multiband signal created from a plurality of communication bands.

10. A front-end module comprising:
a multiplexer network configured to receive a signal from a diversity antenna and to split the signal into a plurality of signal portions corresponding to a plurality of communication bands; and
an integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, a plurality of resonant circuits, each resonant circuit corresponding to a different low noise amplifier from the plurality of low noise amplifiers, and a combiner configured to combine a plurality of integrous signals, each of the integrous signals from the plurality of integrous signals output by a different resonant circuit from the plurality of resonant circuits.

11. A front-end module comprising:
a multiplexer network configured to receive a signal from a diversity antenna and to split the signal into a plurality of signal portions corresponding to a plurality of communication bands; and
an integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, and a plurality of resonant circuits, each resonant circuit corresponding to a different low noise amplifier from the plurality of low noise amplifiers, at least one resonant circuit from the plurality of resonant circuits including a bypass switch that when closed causes a filter circuit of the at least one resonant circuit to be bypassed.

12. A front-end module comprising:
a multiplexer network configured to receive a signal from a diversity antenna and to split the signal into a plurality of signal portions corresponding to a plurality of communication bands; and
an integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, a plurality of resonant circuits, each resonant circuit corresponding to a different low noise amplifier from the plurality of low noise amplifiers, and a switch between low noise amplifier from the plurality of low noise amplifiers and a corresponding resonant circuit from the plurality of resonant circuits, the switch configured to switch between a signal path that includes the corresponding resonant circuit and a bypass path that does not include the corresponding resonant circuit.

13. A front-end module comprising:
a multiplexer network configured to receive a signal from a diversity antenna and to split the signal into a plurality of signal portions corresponding to a plurality of communication bands; and
an integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, and a plurality of resonant circuits, each resonant circuit corresponding to a different low noise amplifier from the plurality of low noise amplifiers, at least one resonant circuit from the plurality of resonant circuits including an adjustable capacitor enabling the at least one resonant circuit to be dynamically adjusted.

14. A wireless device comprising:
an antenna configured to receive a carrier aggregated signal from a base station; and
a front-end module including a multiplexer network and an integrous signal combiner, the multiplexer network configured to split the carrier aggregated signal received at the antenna into a plurality of signal portions corresponding to a plurality of communication bands, the integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, a plurality of resonant circuits, each resonant circuit corresponding to a different low noise amplifier from the plurality of low noise amplifiers, and a plurality of filters positioned between the multiplexer network and the integrous signal combiner, each filter from the plurality of filters receiving a different signal portion from the plurality of signal portions and configured to remove noise components from the received signal portion.

15. The wireless device of claim 14 wherein the antenna is a diversity antenna and the front-end module is a diversity front-end module.

16. A wireless device comprising:
an antenna configured to receive a carrier aggregated signal from a base station; and
a front-end module including a multiplexer network and an integrous signal combiner, the multiplexer network configured to split the carrier aggregated signal received at the antenna into a plurality of signal portions corresponding to a plurality of communication bands, the integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, and a plurality of resonant circuits, each resonant circuit corresponding to a different low noise amplifier from the plurality of low noise amplifiers, each of the plurality of resonant circuits being deactivated when the front-end module receives a single band signal from the antenna.

17. A wireless device comprising:
an antenna configured to receive a carrier aggregated signal from a base station; and
a front-end module including a multiplexer network and an integrous signal combiner, the multiplexer network configured to split the carrier aggregated signal received at the antenna into a plurality of signal portions corresponding to a plurality of communication bands, the integrous signal combiner configured to receive the plurality of communication bands at a plurality of inputs, each input receiving a signal portion associated with a different communication band from the plurality of communication bands, the integrous signal combiner including the plurality of inputs, an output configured to provide an integrous signal to a subsequent processing block, a plurality of low noise amplifiers, and a plurality of resonant circuits, each resonant circuit corresponding to a different low noise amplifier from the plurality of low noise amplifiers, at least one resonant circuit from the plurality of resonant circuits including an adjustable circuit element enabling the at least one resonant circuit to be dynamically tuned.

* * * * *